(12) United States Patent (10) Patent No.: US 8,400,908 B2
Chun et al. (45) Date of Patent: Mar. 19, 2013

(54) METHOD AND APPARATUS FOR TRANSMITTING MIDAMBLE IN WIRELESS COMMUNICATION SYSTEM

(75) Inventors: Jin Young Chun, Seoul (KR); Seung Hyun Kang, Seoul (KR); Bin Chul Ihm, Seoul (KR)

(73) Assignee: LG Electronics Inc., Seoul (KR)

( * ) Notice: Subject to any disclaimer, the term of this patent is extended or adjusted under 35 U.S.C. 154(b) by 364 days.

(21) Appl. No.: 12/819,029

(22) Filed: Jun. 18, 2010

(65) Prior Publication Data

US 2010/0322066 A1 Dec. 23, 2010

Related U.S. Application Data

(60) Provisional application No. 61/218,399, filed on Jun. 18, 2009, provisional application No. 61/218,987, filed on Jun. 22, 2009, provisional application No. 61/224,055, filed on Jul. 9, 2009, provisional application No. 61/228,625, filed on Jul. 27, 2009, provisional application No. 61/235,702, filed on Aug. 21, 2009, provisional application No. 61/237,690, filed on Aug. 28, 2009, provisional application No. 61/238,196, filed on Aug. 30, 2009, provisional application No. 61/238,218, filed on Aug. 31, 2009, provisional application No. 61/238,651, filed on Aug. 31, 2009.

(30) Foreign Application Priority Data

Apr. 9, 2010 (KR) ..................... 10-2010-0032757

(51) Int. Cl.
*H04J 11/00* (2006.01)
*H04Q 7/00* (2006.01)

(52) U.S. Cl. ........ 370/210; 370/329; 370/500; 370/458; 370/330; 455/450; 455/447; 455/446; 375/295; 375/260

(58) Field of Classification Search .................. 370/210, 370/329, 500, 458, 330; 455/450, 447, 446; 375/295, 260

See application file for complete search history.

(56) References Cited

U.S. PATENT DOCUMENTS

2007/0297525 A1* 12/2007 Wu et al. ...................... 375/260
2009/0022235 A1* 1/2009 Zhang et al. ................. 375/260
2009/0219883 A1* 9/2009 Cho et al. ..................... 370/330
2009/0262694 A1* 10/2009 Lee et al. ...................... 370/329

OTHER PUBLICATIONS

D. Slock, "Spatio-Temporal Training Sequence-Based Channel Equalization and Adaptive Interference Cancellation," IEEE International Conference on Acoustics, Speech, and Signal Processing, vol. 5, pp. 2714-2717, May 1996.
A. Dowler et al., "Performance Evaluation of Channel Estimation Techniques in a Multiple Antenna OFDM System," IEEE 58th Vehicular Technology Conference, Vol. 2, pp. 1214-1218, Oct. 2003.
D. Samardzija et al., "Impact of Pilot Design on Achievable Data Rates in Multiple Antenna Multiuser TDD Systems," IEEE Journal on Selected Areas in Communications, vol. 25, No. 7, pp. 1370-1379, Sep. 2007.
H. Lei et al., "A Novel Multi-Cell OFDMA System Structure using Fractional Frequency Reuse," IEEE 18th International Symposium on Personal, Indoor and Mobile Radio Communications, pp. 1-5, Sep. 2007.

* cited by examiner

*Primary Examiner* — Andrew Chriss
*Assistant Examiner* — Jamal Javaid
(74) *Attorney, Agent, or Firm* — Lee, Hong, Degerman, Kang & Waimey

(57) ABSTRACT

A method and apparatus of transmitting a midamble in a wireless communication system is provided. A base station (BS) generates a midamble sequence for each of a plurality of antennas, and transmits the midamble sequence to a user equipment for each antenna. A location of a subcarrier to which each midamble sequence is mapped is determined based on a frequency reuse factor (FRF).

10 Claims, 39 Drawing Sheets

FIG. 10
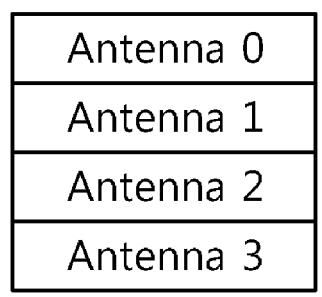
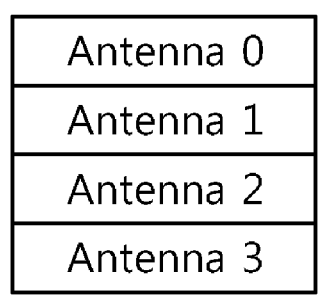
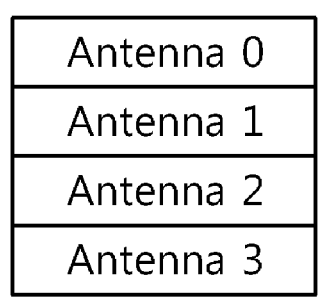
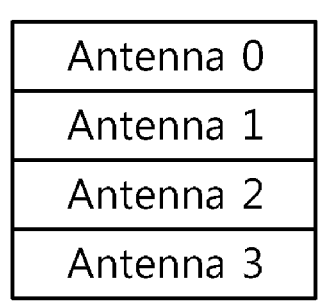

FIG. 15

| | Reuse 0 | | Reuse 1 | | Reuse 2 |
|---|---|---|---|---|---|
| 0 | Ant 0 | 0 | | 0 | |
| 1 | Ant 1 | 1 | | 1 | |
| 2 | | 2 | | 2 | |
| 3 | | 3 | | 3 | |
| 4 | | 4 | Ant 0 | 4 | |
| 5 | | 5 | Ant 1 | 5 | |
| 6 | | 6 | | 6 | |
| 7 | | 7 | | 7 | |
| 8 | | 8 | | 8 | Ant 0 |
| 9 | | 9 | | 9 | Ant 1 |
| 10 | | 10 | | 10 | |
| 11 | | 11 | | 11 | |
| 12 | Ant 0 | 12 | | 12 | |
| 13 | Ant 1 | 13 | | 13 | |
| 14 | | 14 | | 14 | |
| 15 | | 15 | | 15 | |
| 16 | | 16 | Ant 0 | 16 | |
| 17 | | 17 | Ant 1 | 17 | |
| | ⋮ | | ⋮ | | ⋮ |

FIG. 16

| | Reuse 0 | | Reuse 1 | | Reuse 2 |
|---|---|---|---|---|---|
| 0 | Ant 0 | 0 | | 0 | |
| 1 | Ant 1 | 1 | | 1 | |
| 2 | Ant 2 | 2 | | 2 | |
| 3 | Ant 3 | 3 | | 3 | |
| 4 | | 4 | Ant 0 | 4 | |
| 5 | | 5 | Ant 1 | 5 | |
| 6 | | 6 | Ant 2 | 6 | |
| 7 | | 7 | Ant 3 | 7 | |
| 8 | | 8 | | 8 | Ant 0 |
| 9 | | 9 | | 9 | Ant 1 |
| 10 | | 10 | | 10 | Ant 2 |
| 11 | | 11 | | 11 | Ant 3 |
| 12 | Ant 0 | 12 | | 12 | |
| 13 | Ant 1 | 13 | | 13 | |
| 14 | Ant 2 | 14 | | 14 | |
| 15 | Ant 3 | 15 | | 15 | |
| 16 | | 16 | Ant 0 | 16 | |
| 17 | | 17 | Ant 1 | 17 | |
| ⋮ | | ⋮ | | ⋮ | |

FIG. 17

| | Reuse 0 |
|---|---|
| 0 | Ant 0,4 |
| 1 | Ant 1,5 |
| 2 | Ant 2,6 |
| 3 | Ant 3,7 |
| 4 | |
| 5 | |
| 6 | |
| 7 | |
| 8 | |
| 9 | |
| 10 | |
| 11 | |
| 12 | Ant 0,4 |
| 13 | Ant 1,5 |
| 14 | Ant 2,6 |
| 15 | Ant 3,7 |
| 16 | |
| 17 | |

⋮

| | Reuse 1 |
|---|---|
| 0 | |
| 1 | |
| 2 | |
| 3 | |
| 4 | Ant 0,4 |
| 5 | Ant 1,5 |
| 6 | Ant 2,6 |
| 7 | Ant 3,7 |
| 8 | |
| 9 | |
| 10 | |
| 11 | |
| 12 | |
| 13 | |
| 14 | |
| 15 | |
| 16 | Ant 0,4 |
| 17 | Ant 1,5 |

⋮

| | Reuse 2 |
|---|---|
| 0 | |
| 1 | |
| 2 | |
| 3 | |
| 4 | |
| 5 | |
| 6 | |
| 7 | |
| 8 | Ant 0,4 |
| 9 | Ant 1,5 |
| 10 | Ant 2,6 |
| 11 | Ant 3,7 |
| 12 | |
| 13 | |
| 14 | |
| 15 | |
| 16 | |
| 17 | |

| | Reuse 0 | | Reuse 1 |
|---|---|---|---|
| 0 | Ant 0 | 0 | Ant 0 |
| 1 | Ant 1 | 1 | Ant 1 |
| 2 | Ant 2 | 2 | Ant 2 |
| 3 | Ant 3 | 3 | Ant 3 |
| 4 | Ant 4 | 4 | Ant 4 |
| 5 | Ant 5 | 5 | Ant 5 |
| 6 | Ant 6 | 6 | Ant 6 |
| 7 | Ant 7 | 7 | Ant 7 |
| 8 | | 8 | Ant 0 |
| 9 | | 9 | Ant 1 |
| 10 | | 10 | Ant 2 |
| 11 | | 11 | Ant 3 |
| 12 | Ant 0 | 12 | Ant 4 |
| 13 | Ant 1 | 13 | Ant 5 |
| 14 | Ant 2 | 14 | Ant 6 |
| 15 | Ant 3 | 15 | Ant 7 |
| 16 | Ant 4 | 16 | Ant 0 |
| 17 | Ant 5 | 17 | Ant 1 |

Midamble subcarrier index →

Pattern 1

| # | |
|---|---|
| 0 | Ant 0,2 |
| 1 | Ant 1,3 |
| 2 | |
| 3 | |
| 4 | |
| 5 | |
| 6 | Ant 0,2 |
| 7 | Ant 1,3 |
| 8 | |
| 9 | |
| 10 | |
| 11 | |
| 12 | Ant 0,2 |
| 13 | Ant 1,3 |
| 14 | |
| 15 | |
| 16 | |
| 17 | |

⋮

Pattern 2

| # | |
|---|---|
| 0 | |
| 1 | |
| 2 | Ant 0,2 |
| 3 | Ant 1,3 |
| 4 | |
| 5 | |
| 6 | |
| 7 | |
| 8 | Ant 0,2 |
| 9 | Ant 1,3 |
| 10 | |
| 11 | |
| 12 | |
| 13 | |
| 14 | Ant 0,2 |
| 15 | Ant 1,3 |
| 16 | |
| 17 | |

⋮

Pattern 3

| # | |
|---|---|
| 0 | |
| 1 | |
| 2 | |
| 3 | |
| 4 | Ant 0,2 |
| 5 | Ant 1,3 |
| 6 | |
| 7 | |
| 8 | |
| 9 | |
| 10 | Ant 0,2 |
| 11 | Ant 1,3 |
| 12 | |
| 13 | |
| 14 | |
| 15 | |
| 16 | Ant 0,2 |
| 17 | Ant 1,3 |

Midamble subcarrier index →

Pattern 1
| # | |
|---|---|
| 0 | Ant 0,2,4,6 |
| 1 | Ant 1,3,5,7 |
| 2 | |
| 3 | |
| 4 | |
| 5 | |
| 6 | Ant 0,2,4,6 |
| 7 | Ant 1,3,5,7 |
| 8 | |
| 9 | |
| 10 | |
| 11 | |
| 12 | Ant 0,2,4,6 |
| 13 | Ant 1,3,5,7 |
| 14 | |
| 15 | |
| 16 | |
| 17 | |

⋮

Pattern 2
| # | |
|---|---|
| 0 | |
| 1 | |
| 2 | Ant 0,2,4,6 |
| 3 | Ant 1,3,5,7 |
| 4 | |
| 5 | |
| 6 | |
| 7 | |
| 8 | Ant 0,2,4,6 |
| 9 | Ant 1,3,5,7 |
| 10 | |
| 11 | |
| 12 | |
| 13 | |
| 14 | Ant 0,2,4,6 |
| 15 | Ant 1,3,5,7 |
| 16 | |
| 17 | |

⋮

Pattern 3
| # | |
|---|---|
| 0 | |
| 1 | |
| 2 | |
| 3 | |
| 4 | Ant 0,2,4,6 |
| 5 | Ant 1,3,5,7 |
| 6 | |
| 7 | |
| 8 | |
| 9 | |
| 10 | Ant 0,2,4,6 |
| 11 | Ant 1,3,5,7 |
| 12 | |
| 13 | |
| 14 | |
| 15 | |
| 16 | Ant 0,2,4,6 |
| 17 | Ant 1,3,5,7 |

| | Pattern 1 | Pattern 2 | Pattern 3 |
|---|---|---|---|
| 0 | Ant 0 | | |
| 1 | Ant 1 | | |
| 2 | Ant 2 | | |
| 3 | Ant 3 | | |
| 4 | | | |
| 5 | | | |
| 6 | | | |
| 7 | | | |
| 8 | | Ant 0 | |
| 9 | | Ant 1 | |
| 10 | | Ant 2 | |
| 11 | | Ant 3 | |
| 12 | | | |
| 13 | | | |
| 14 | | | |
| 15 | | | |
| 16 | | | Ant 0 |
| 17 | | | Ant 1 |
| 18 | | | Ant 2 |
| 19 | | | Ant 3 |
| 20 | | | |
| 21 | | | |
| 22 | | | |
| 23 | | | |
| 24 | Ant 0 | | |
| 25 | Ant 1 | | |
| 26 | Ant 2 | | |
| 27 | Ant 3 | | |
| 28 | | | |
| 29 | | | |
| 30 | | | |
| 31 | | | |
| 32 | | Ant 0 | |
| 33 | | Ant 1 | |
| 34 | | Ant 2 | |
| 35 | | Ant 3 | |
| 36 | | | |
| 37 | | | |
| 38 | | | |
| 39 | | | |
| 40 | | | Ant 0 |
| 41 | | | Ant 1 |
| 42 | | | Ant 2 |
| 43 | | | Ant 3 |
| 44 | | | |
| 45 | | | |
| 46 | | | |
| 47 | | | |

Midamble subcarrier index

FIG. 24

| | Pattern 1 | | Pattern 2 | | Pattern 3 |
|---|---|---|---|---|---|
| 0 | Ant 0 | 0 | | 0 | |
| 1 | Ant 1 | 1 | | 1 | |
| 2 | Ant 2 | 2 | | 2 | |
| 3 | Ant 3 | 3 | | 3 | |
| 4 | Ant 4 | 4 | | 4 | |
| 5 | Ant 5 | 5 | | 5 | |
| 6 | Ant 6 | 6 | | 6 | |
| 7 | Ant 7 | 7 | | 7 | |
| 8 | | 8 | Ant 0 | 8 | |
| 9 | | 9 | Ant 1 | 9 | |
| 10 | | 10 | Ant 2 | 10 | |
| 11 | | 11 | Ant 3 | 11 | |
| 12 | | 12 | Ant 4 | 12 | |
| 13 | | 13 | Ant 5 | 13 | |
| 14 | | 14 | Ant 6 | 14 | |
| 15 | | 15 | Ant 7 | 15 | |
| 16 | | 16 | | 16 | Ant 0 |
| 17 | | 17 | | 17 | Ant 1 |
| 18 | | 18 | | 18 | Ant 2 |
| 19 | | 19 | | 19 | Ant 3 |
| 20 | | 20 | | 20 | Ant 4 |
| 21 | | 21 | | 21 | Ant 5 |
| 22 | | 22 | | 22 | Ant 6 |
| 23 | | 23 | | 23 | Ant 7 |
| 24 | Ant 0 | 24 | | 24 | |
| 25 | Ant 1 | 25 | | 25 | |
| 26 | Ant 2 | 26 | | 26 | |
| 27 | Ant 3 | 27 | | 27 | |
| 28 | Ant 4 | 28 | | 28 | |
| 29 | Ant 5 | 29 | | 29 | |
| 30 | Ant 6 | 30 | | 30 | |
| 31 | Ant 7 | 31 | | 31 | |
| 32 | | 32 | Ant 0 | 32 | |
| 33 | | 33 | Ant 1 | 33 | |
| 34 | | 34 | Ant 2 | 34 | |
| 35 | | 35 | Ant 3 | 35 | |
| 36 | | 36 | Ant 4 | 36 | |
| 37 | | 37 | Ant 5 | 37 | |
| 38 | | 38 | Ant 6 | 38 | |
| 39 | | 39 | Ant 7 | 39 | |
| 40 | | 40 | | 40 | Ant 0 |
| 41 | | 41 | | 41 | Ant 1 |
| 42 | | 42 | | 42 | Ant 2 |
| 43 | | 43 | | 43 | Ant 3 |
| 44 | | 44 | | 44 | Ant 4 |
| 45 | | 45 | | 45 | Ant 5 |
| 46 | | 46 | | 46 | Ant 6 |
| 47 | | 47 | | 47 | Ant 7 |

Midamble subcarrier index

METHOD AND APPARATUS FOR TRANSMITTING MIDAMBLE IN WIRELESS COMMUNICATION SYSTEM

CROSS-REFERENCE TO RELATED APPLICATIONS

This application claims the benefit of priority of U.S. Provisional application No. 61/218,399 filed on Jun. 18, 2009, U.S. Provisional application No. 61/218,987 filed on Jun. 22, 2009, U.S. Provisional application No. 61/224,055 filed on Jul. 9, 2009, U.S. Provisional application No. 61/228,625 filed on Jul. 27, 2009, U.S. Provisional application No. 61/235,702 filed on Aug. 21, 2009, U.S. Provisional application No. 61/237,690 filed on Aug. 28, 2009, U.S. Provisional application No. 61/238,196 filed on Aug. 30, 2009, U.S. Provisional application No. 61/238,218 filed on Aug. 31, 2009, U.S. Provisional application No. 61/238,651 filed on Aug. 31, 2009, and Korean Patent application No. 10-2010-0032757 filed on Apr. 9, 2010, all of which are incorporated by reference in their entirety herein.

BACKGROUND OF THE INVENTION

1. Field of the Invention

The present invention relates to wireless communications, and more particularly, to a method and apparatus for transmitting a midamble in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., $4^{th}$ generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

Effective transmission/reception methods and utilizations have been proposed for a broadband wireless communication system to maximize efficiency of radio resources. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

MIMO technology can be used to improve the efficiency of data transmission and reception using multiple transmission antennas and multiple reception antennas. MIMO technology includes spatial multiplexing, transmit diversity, beam-forming and the like. An MIMO channel matrix according to the number of reception antennas and the number of transmission antennas can be decomposed into a number of independent channels. Each of the independent channels is called a layer or stream. The number of layers is called a rank.

A pilot can be transmitted from a base station (BS) to a user equipment (UE) through a downlink. The pilot can also be referred to as other terminologies such as a reference signal according to a wireless communication system. The pilot may be used to perform channel estimation or to measure a channel quality indicator (CQI). The CQI may include a signal to interference plus noise ratio (SINR), a frequency offset estimation, etc. To optimize system performance in different transmission environments, an 802.16m system provides a common pilot structure and a dedicated pilot structure. The common pilot structure and the dedicated pilot structure can be identified according to a resource in use. A common pilot can be used by all UEs. A dedicated pilot can be used by a UE to which a specific resource is allocated. Therefore, precoding or beamforming may be performed on the dedicated pilot in the same method as that used for a data subcarrier. A pilot structure can be defined for up to 8 transmission streams, and may have a unified pilot structure according to the common pilot and the dedicated pilot.

A midamble is a signal transmitted by a BS to allow a UE to directly measure a channel state. When the BS transmits signals by using a multiple input multiple output (MIMO) technique through a plurality of antennas, the BS can transmit different signals for the respective antennas or transmit signals at different locations in a resource region, and the UE can measure a channel state for each antenna of the BS by receiving a midamble and thus estimate a channel state of a serving cell or an interference level of a neighbor cell. The BS can adaptively schedule resources by receiving a feedback of the channel state estimated by the UE.

When transmitting the midamble for each antenna, a frequency partition or a reuse factor has to be considered. In this case, the midamble transmitted through each antenna can be multiplexed in various manners. If the number of transmit antennas is different between neighbor cells, a level of interference influenced by the neighbor cell may differ according to a location of a subcarrier to which a midamble sequence is mapped. In addition, the midamble may have a similar structure as that of a preamble, and thus the UE may erroneously receive a preamble instead of a detected midamble. Accordingly, there is a need for a robust midamble structure by which the UE can correctly detect a midamble irrespective of the number of transmit antennas.

SUMMARY OF THE INVENTION

It is, therefore, an object of the present invention to provide a method and apparatus for transmitting a midamble in a wireless communication system.

In an aspect, a method of transmitting a midamble in a wireless communication system is provided. The method include generating a midamble sequence for each of a plurality of antennas, and transmitting the midamble sequence to a user equipment for each antenna, wherein a location of a subcarrier to which each midamble sequence is mapped is determined based on a frequency reuse factor (FRF). The location of the subcarrier to which each midamble is mapped may be determined based on the following equation $$b_k = \begin{cases} \sqrt{3 \cdot 10^{0.2}} \cdot \{1 - 2 \cdot G([k+u+\text{offset}_D(\text{fft})] \bmod \text{fft})\}, \\ \qquad \text{when } k \neq \frac{N_{used}-1}{2}, \\ (k-s) \bmod (3 \cdot N_t) = 3 \cdot g + \left( \left\lfloor \frac{BSID}{256} \right\rfloor + \left\lfloor \frac{k-s}{N_1 \times N_{sc}} \right\rfloor \right) \bmod 3 \\ 0, \text{ when otherwise} \end{cases}$$

where $b_k$ is a complex coefficient for modulating subcarriers in an orthogonal frequency division multiplexing (OFDM) symbol to which the midamble sequence is mapped, k is a subcarrier index ($0 \leq k \leq N_{used}-1$), $N_{used}$ is the number of subcarriers to which a midamble sequence is mapped, Nt is the number of transmit antennas, G(x) is a Golay sequence ($0 \leq x < 2047$) having a length of 2048 bits, fft is a fast Fourier transform (FFT) size, BSID is a cell identifier (ID), u is a shift value ($0 \leq u \leq 127$) which can be determined by u=mod(BSID, 128), $\text{offset}_D(\text{fft})$ is an offset value which differs depending on an FFT size, g is a transmit antenna index, and s is a parameter that varies depending on k wherein s=0 when $k \leq (N_{used}-1)/2$ and s=1 when $k > (N_{used}-1)/2$. A location of a subcarrier to which each midamble sequence is mapped may be fixed irrespective of the number of the plurality of antennas in one subband. The respective midamble sequences may be mapped to subcarriers in a unit of subband comprising 72 contiguous subcarriers. The respective midamble sequences may be mapped by being shifted along a frequency domain in each subband. The respective midamble sequences may be mapped by being shifted to a subcarrier allocated to another reuse region along the frequency domain in contiguous subbands. The respective midamble sequences may be mapped with a spacing of one of 6 subcarriers, 12 subcarriers and 24 subcarriers. The respective midamble sequences may be multiplexed based on at least one of multiplexing schemes comprising frequency division multiplexing (FDM), code division multiplexing (CDM), and time division multiplexing (TDM). The respective midamble sequences may be transmitted in a second downlink subframe of a radio frame comprising a plurality of subframes in a time domain. The respective midamble sequences may be mapped to a first OFDM symbol of the second downlink subframe.

In another aspect, an apparatus for transmitting a midamble in a wireless communication system is provided. The apparatus include a transmit circuitry for transmitting a midamble sequence for each of a plurality of antennas to a user equipment through each antenna, and a midamble sequence generator for generating the midamble sequence, wherein a location of a subcarrier to which each midamble sequence is mapped is determined based on a frequency reuse factor (FRF).

In another aspect, an apparatus for receiving a midamble in a wireless communication system is provided. The apparatus include a receive circuitry for receiving a radio signal and a plurality of midamble sequences transmitted from a base station, a channel estimator for estimating a channel state for each antenna on the basis of the plurality of midamble sequences, and a processor for processing the radio signal on the basis of the estimated channel state, wherein a location of a subcarrier to which each midamble sequence is mapped is determined based on a frequency reuse factor (FRF).

BRIEF DESCRIPTION OF THE DRAWINGS

FIG. 10 shows an example of a midamble structure in which a midamble sequence of each antenna is mapped to a resource region by being multiplexed using FDM.
FIG. 15 to FIG. 26 shows an example of a midamble structure according to the proposed midamble transmission method.

DESCRIPTION OF EXEMPLARY EMBODIMENTS

A technology below can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented using radio technology, such as Universal Terrestrial Radio Access (UTRA) or CDMA2000. TDMA can be implemented using radio technology, such as Global System for Mobile communications (GSM)/General Packet Radio Service (GPRS)/Enhanced Data Rates for GSM Evolution (EDGE). OFDMA can be implemented using radio technology, such as IEEE 802.11 (Wi-Fi), IEEE 802.16(WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a Universal Mobile Telecommunications System (UMTS). 3rd Generation Partnership Project (3GPP) Long Term Evolution (LET) is part of Evolved UMTS (E-UMTS) using Evolved-UMTS Terrestrial Radio Access (E-UTRA), and it adopts OFDMA in downlink (DL) and SC-FDMA in uplink (UL). LTE-A (Advanced) is the evolution of 3GPP LTE.

IEEE 802.16m is chiefly described as an example in order to clarify the description, but the technical spirit of the present invention is not limited to IEEE 802.16e.

Figure 1:
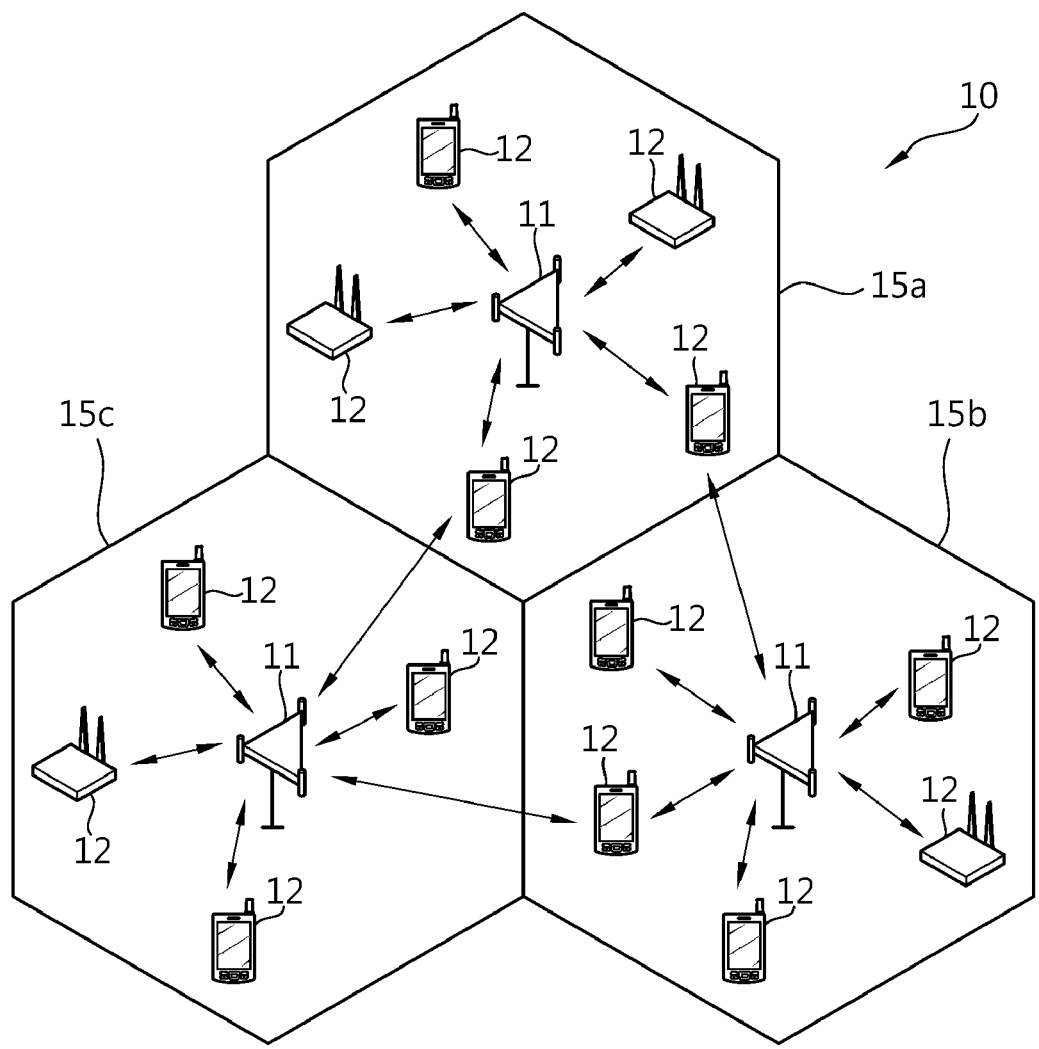
FIG. 1 shows a wireless communication system.

FIG. 1 shows a wireless communication system.

Referring to FIG. 1, the wireless communication system 10 includes one or more Base Stations (BSs) 11. The BSs 11 provide communication services to respective geographical areas (in general called 'cells') 15a, 15b, and 15c. Each of the cells can be divided into a number of areas (called 'sectors'). A User Equipment (UE) 12 can be fixed or mobile and may be referred to as another terminology, such as a Mobile Station (MS), a Mobile Terminal (MT), a User Terminal (UT), a Subscriber Station (SS), a wireless device, a Personal Digital Assistant (PDA), a wireless modem, or a handheld device. In general, the BS 11 refers to a fixed station that communicates with the UEs 12, and it may be referred to as another terminology, such as an evolved-NodeB (eNB), a Base Transceiver System (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
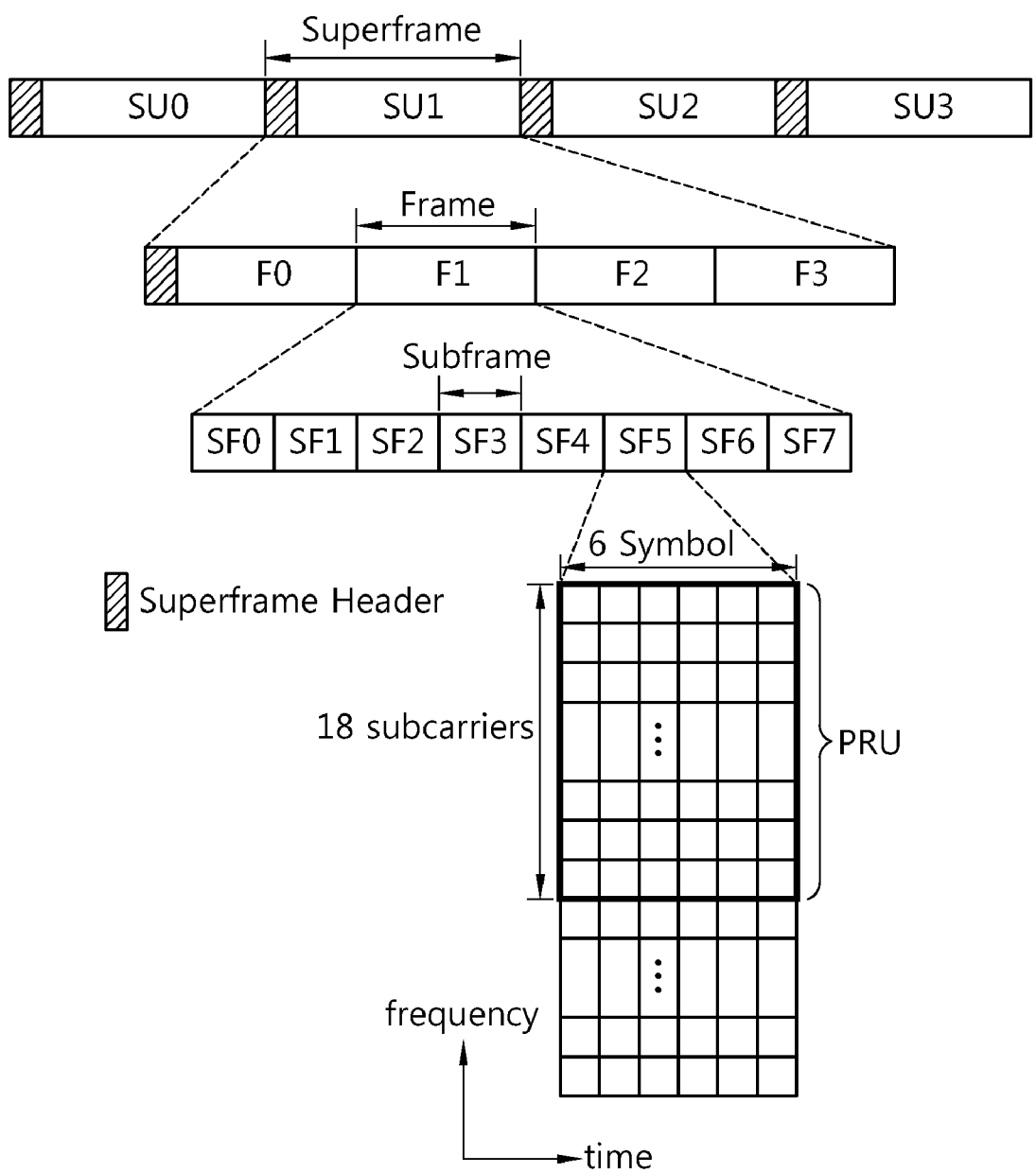
FIG. 2 shows an example of a frame structure.

FIG. 2 shows an example of a frame structure.

Referring to FIG. 2, a superframe (SF) includes a superframe header (SFH) and four frames F0, F1, F2, and F3. Each frame may have the same length in the SF. Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

The SFH can carry an essential system parameter and system configuration information. The SFH may be located in a first subframe of the SF. The SFH can be classified into a primary-SFH (P-SFH) and a secondary-SFH (S-SFH). The P-SFH and the S-SFH may be transmitted in every superframe.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDM symbol, an SC-FDMA symbol, etc., according to a multiple access scheme. The subframe can consist of 5, 6, 7, or 9 OFDM symbols. However, this is for exemplary purposes only, and thus the number of OFDM symbols included in the subframe is not limited thereto. The number of OFDM symbols included in the subframe may change variously according to a channel bandwidth and a CP length. A subframe type may be defined according to the number of OFDM symbols included in the subframe. For example, it can be defined such that a type-1 subframe includes 6 OFDM symbols, a type-2 subframe includes 7 OFDM symbols, a type-3 subframe includes 5 OFDM symbols, and a type-4 subframe includes 9 OFDM symbols. One frame may include subframes each having the same type. Alternatively, one frame may include subframes each having a different type. That is, the number of OFDM symbols included in each subframe may be identical or different in one frame. Alternatively, the number of OFDM symbols included in at least one subframe of one frame may be different from the number of OFDM symbols of the remaining subframes of the frame.

Time division duplexing (TDD) or frequency division duplexing (FDD) may be applied to the frame. In the TDD, each subframe is used in uplink or downlink transmission at the same frequency and at a different time. That is, subframes included in a TDD frame are divided into an uplink subframe and a downlink subframe in the time domain. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

A subframe includes a plurality of physical resource units (PRUs) in the frequency domain. The PRU is a basic physical unit for resource allocation, and consists of a plurality of consecutive OFDM symbols in the time domain and a plurality of consecutive subcarriers in the frequency domain. The number of OFDM symbols included in the PRU may be equal to the number of OFDM symbols included in one subframe. Therefore, the number of OFDM symbols in the PRU can be determined according to a subframe type. For example, when one subframe consists of 6 OFDM symbols, the PRU may be defined with 18 subcarriers and 6 OFDM symbols.

A logical resource unit (LRU) is a basic logical unit for distributed resource allocation and contiguous resource allocation. The LRU is defined with a plurality of OFDM symbols and a plurality of subcarriers, and includes pilots used in the PRU. Therefore, a desired number of subcarriers for one LRU depends on the number of allocated pilots.

A distributed logical resource unit (DLRU) may be used to obtain a frequency diversity gain. The DLRU includes a distributed subcarrier group in one frequency partition. The DRU has the same size as the PRU. One subcarrier is a basic unit of constituting the DRU.

A contiguous logical resource unit (CLRU) may be used to obtain a frequency selective scheduling gain. The CLRU includes a localized subcarrier group. The CLRU has the same size as the PRU.

Meanwhile, a fractional frequency reuse (FFR) scheme can be used in a cellular system having multiple cells. The FFR scheme splits a full frequency band into a plurality of frequency partitions (FPs), and allocates a part of the FP to each cell. According to the FFR scheme, different FPs can be allocated between neighbor cells, and the same FP can be allocated between cells separated far from one another. Therefore, inter-cell interference (ICI) can be reduced, and performance of a UE located in a cell edge can be increased.

Figure 3:
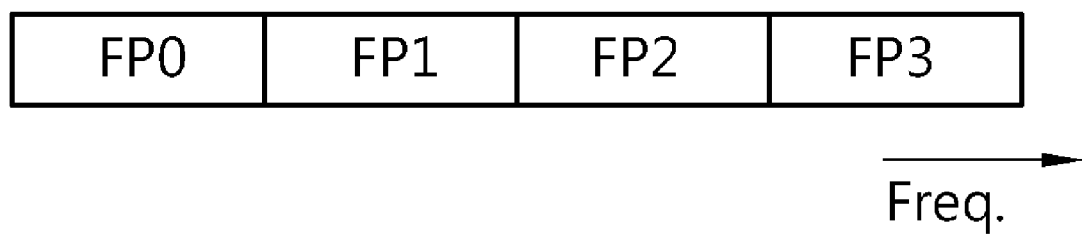
FIG. 3 shows an example of a method of splitting a full frequency band into a plurality of FPs.

FIG. 3 shows an example of a method of splitting a full frequency band into a plurality of FPs.

Referring to FIG. 3, the full frequency band is split into frequency partition #0, frequency partition #1, frequency partition #2, and frequency partition #3. Each FP can be physically or logically split from the full frequency band.

Figure 4:
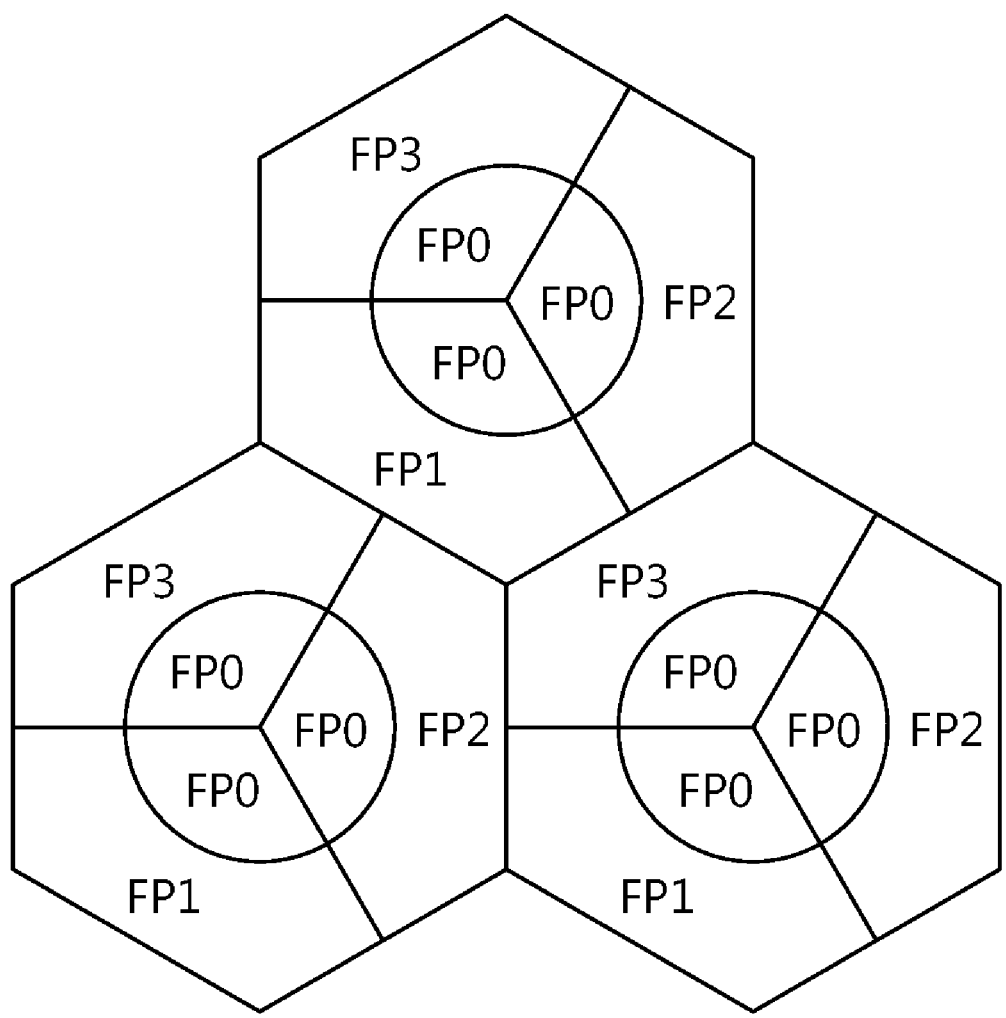
FIG. 4 shows an example of a cellular system using an FFR scheme.

FIG. 4 shows an example of a cellular system using an FFR scheme.

Referring to FIG. 4, each cell is divided into an inner cell and a cell edge. Further, each cell is divided into three sectors. A full frequency band is split into four FPs (i.e., frequency partition #0, frequency partition #1, frequency partition #2, and frequency partition #3).

The frequency partition #0 is allocated in an inner cell. Any one of the frequency partition #1 to the frequency partition #3 is allocated in each sector of a cell edge. In this case, different FPs are allocated between neighbor cells. Hereinafter, an allocated FP is referred to as an active FP, and an unallocated FP is referred to as an inactive FP. For example, when the frequency partition #1 is allocated, the frequency partition #1 is an active FP, and the frequency partition #2 and the frequency partition #3 are inactive FPs.

A frequency reuse factor (FRF) can be defined according to the number of cells (or sectors) into which the full frequency band can be split. In this case, the FRF may be 1 in an inner cell, and may be 3 in each sector of a cell edge.

Figure 5:
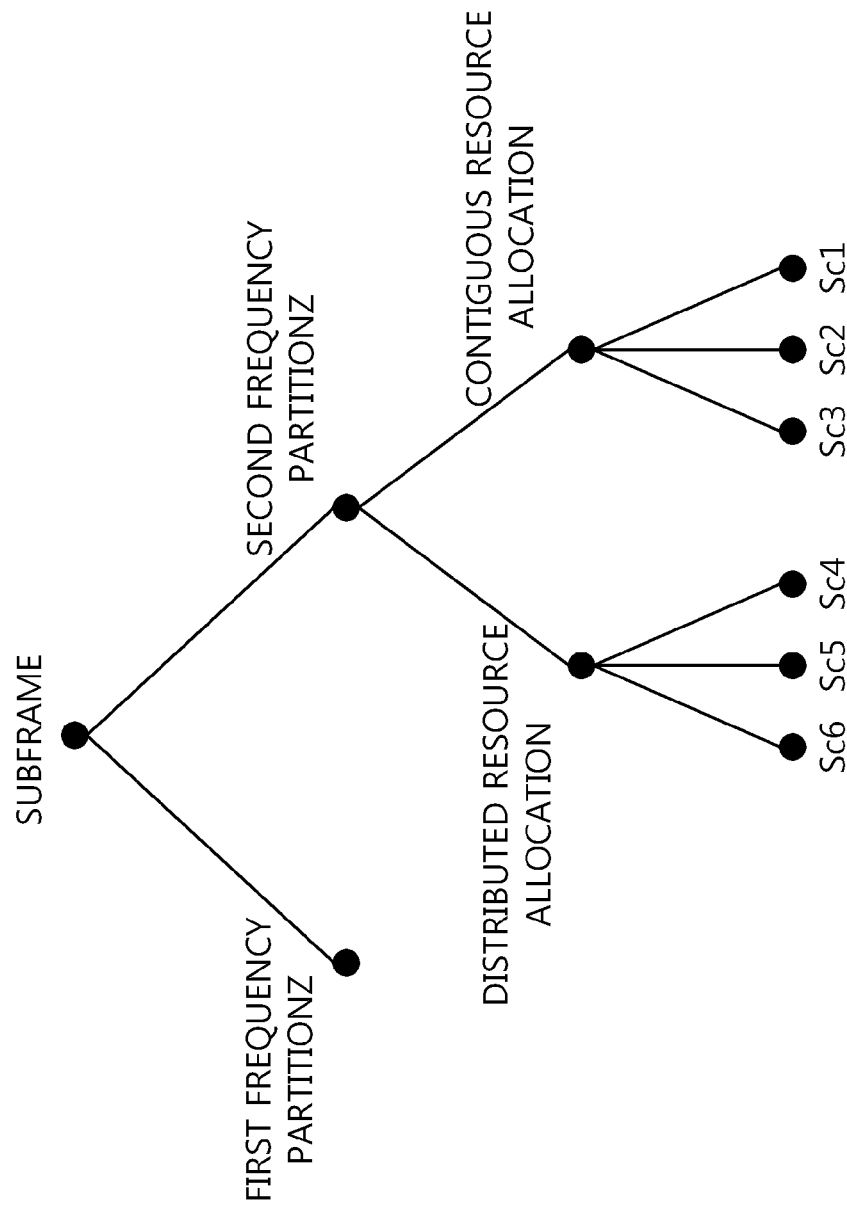
FIG. 5 shows an example of a downlink resource structure.

FIG. 5 shows an example of a downlink resource structure.

Referring to FIG. 5, a downlink subframe can be divided into at least one FP. Herein, the subframe is divided into two FPs (i.e., FP1 and FP2) for example. However, the number of FPs in the subframe is not limited thereto. The number of FPs can be 4 at most. Each FP can be used for other purposes such as FFR.

Each FP consists of at least one PRU. Each FP may include distributed resource allocation and/or contiguous resource allocation. Herein, the second FP (i.e., FP2) includes the distributed resource allocation and the contiguous resource allocation. 'Sc' denotes a subcarrier.

When a plurality of cells exist, a downlink resource may be mapped by performing various processes such as subband partitioning, miniband permutation, frequency partitioning, etc.

First, the subband partitioning process will be described.

Figure 6:
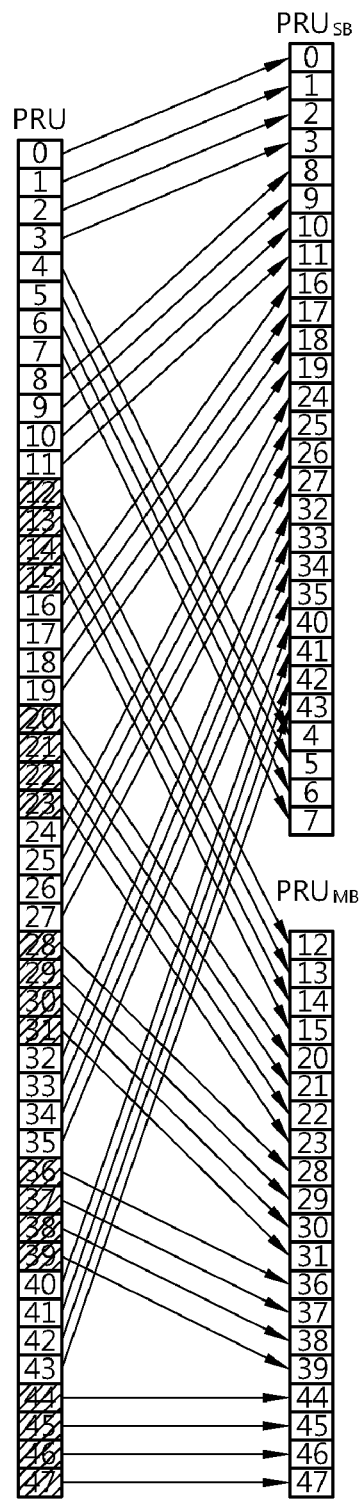
FIG. 6 shows an example of a subband partitioning process.

FIG. 6 shows an example of a subband partitioning process. A bandwidth of 10 MHz is used in the subband partitioning process of FIG. 6.

A plurality of PRUs are divided into a subband (SB) and a miniband (MB). The plurality of PRUs are allocated to the SB in FIG. 6(a), and are allocated to the MB in FIG. 6(b). The SB includes N1 contiguous PRUs, and the MB includes N2 contiguous PRUs. In this case, N1 may be 4 and N2 may be 1. The SB is suitable for frequency selective resource allocation since it provides contiguous allocation of PRUs in a frequency domain. The MB is suitable for frequency diverse resource allocation and may be permutated in the frequency domain.

The number of SBs can be denoted by $K_{SB}$. The number of PRUs allocated to the SBs can be denoted by $L_{SB}$, where $L_{SB}=N1*K_{SB}$. The $K_{SB}$ may vary depending on a bandwidth. The $K_{SB}$ may be determined by a downlink subband allocation count (DSAC). A length of the DSAC may be 3 bits or 5 bits, and may be broadcast by using an SFH or the like. PRUs remaining after being allocated to the SBs are allocated to MBs. The number of MBs can be denoted by $K_{MB}$. The number of PRUs allocated to the MBs can be denoted by $L_{MB}$, where $L_{MB}=N2*K_{MB}$. The total number of PRUs is $N_{PRU}=L_{SB}+L_{MB}$.

A plurality of PRUs are divided into a subband (SB) and a miniband (MB), and are reordered in an SB PRU ($PRU_{SB}$) and an MB PRU ($PRU_{MB}$). PRUs in the $PRU_{SB}$ are respectively indexed from 0 to ($L_{SB}-1$). PRUs in the $PRU_{MB}$ are respectively indexed from 0 to ($L_{MB}-1$).

Figure 7:
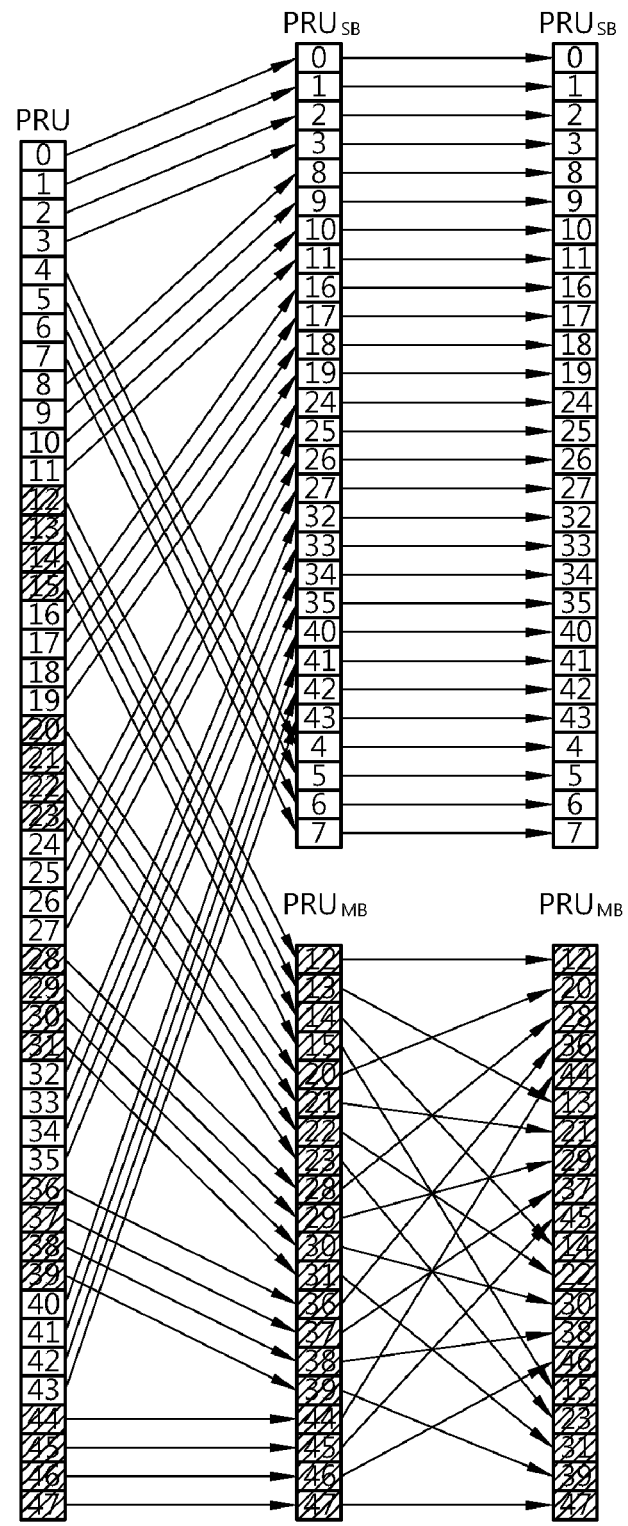
FIG. 7 shows an example of a miniband permutation process.

FIG. 7 shows an example of a miniband permutation process. In the miniband permutation process, a $PRU_{MB}$ is mapped to a permutation PRU ($PPRU_{MB}$). This is to ensure frequency diversity in each frequency partition. The process of FIG. 7 can be performed subsequent to the subband partitioning process of FIG. 6 when using a bandwidth of 10 MHz. PRUs in the $PRU_{MB}$ are permutated and mapped to the $PPRU_{MB}$.

Figure 8:
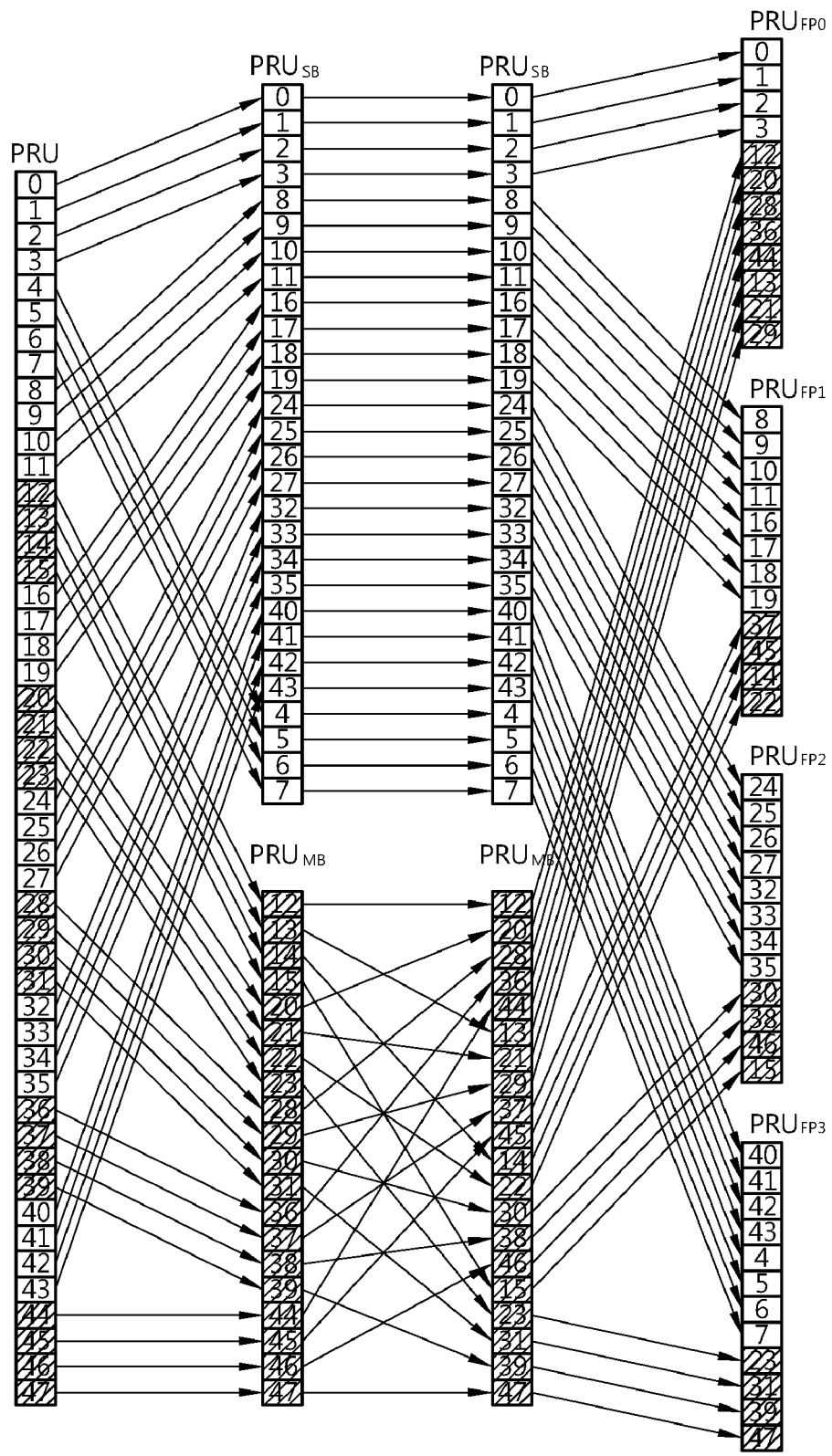
FIG. 8 shows an example of a frequency partitioning process.

FIG. 8 shows an example of a frequency partitioning process. The process of FIG. 8 can be performed subsequent to the subband partitioning process of FIG. 6 and the miniband permutation process of FIG. 7 when using a bandwidth of 10 MHz.

PRUs of a $PRU_{SB}$ and a $PPRU_{MB}$ are allocated to at least one frequency partition. The maximum number of frequency partitions may be 4. Frequency partition configuration information may be determined by downlink frequency partition configuration (DFPC). The DFPC may have a different configuration according to a bandwidth, and may be broadcast by using an S-SFH or the like. The DFPC may indicate a size of a frequency partition, the number of frequency partitions, etc. A frequency partition count (FPCT) indicates the number of frequency partitions. FPSi indicates the number of PRUs allocated to a frequency partition #i. Further, an downlink frequency partition subband count (DFPSC) defines the number of subbands allocated to an FPi (i>0). The UFPSC may have a length of 1 to 3 bits.

Figure 9:
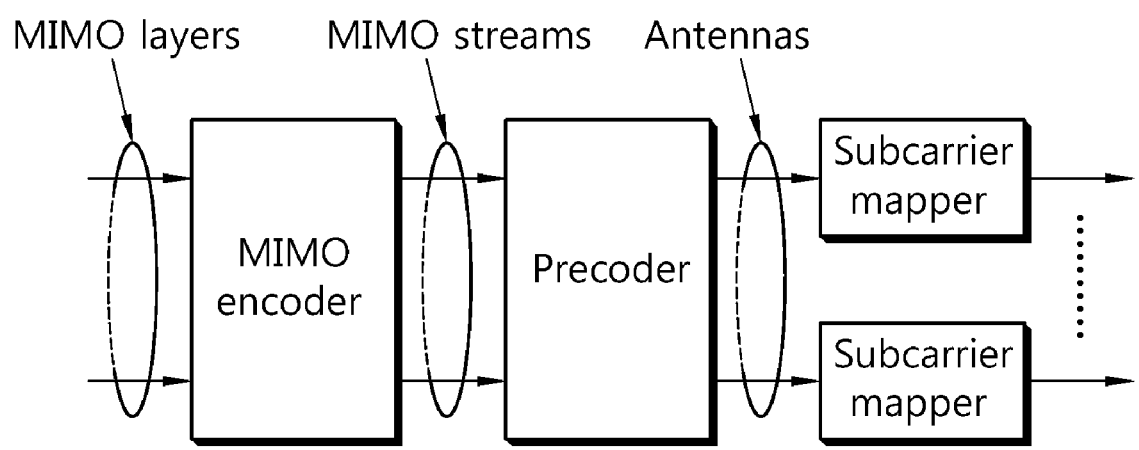
FIG. 9 shows a downlink multiple input multiple output (MIMO) structure in a transmitter.

FIG. 9 shows a downlink multiple input multiple output (MIMO) structure in a transmitter. To perform downlink MIMO, the transmitter may include a MIMO encoder 51, a precoder 52, and a subcarrier mapper 53. The MIMO encoder 51 maps L MIMO layers (where $L \geqq 1$) to Mt MIMO streams (where $Mt \geqq L$). When spatial multiplexing is used in single user MIMO (SU-MIMO), a rank is defined by the number of streams to be used by a user allocated to a resource unit. In the SU-MIMO, one resource unit is allocated to only one user, and only one forward error correction (FEC) block exists as an input of the MIMO encoder 51. In case of multi user MIMO (MU-MIMO), a plurality of users can be allocated to one resource unit. Therefore, a plurality of FEC blocks may exist as an input of the MIMO encoder 51. The Mt MIMO streams are inputs of the precoder 52. The precoder 52 generates a plurality of antenna-specific data symbols according to a selected MIMO mode and maps the Mt streams to respective antennas. The subcarrier mapper 53 maps the respective antenna-specific data symbols to orthogonal frequency division multiplexing (OFDM) symbols.

A channel state may be measured for each antenna by using a MIMO midamble (hereinafter, a midamble). A user equipment (UE) may receive the midamble from each antenna to measure a channel state and a level of interference from a neighbor cell. A base station (BS) may receive a feedback of the channel state measured by the UE to adaptively schedule a resource. In case of closed-loop MIMO, the midamble may be used to select a precoding matrix indicator (PMI). In case of open-loop MIMO, the midamble may be used to measure a channel quality indicator (CQI). Further, the midamble may be transmitted in a $2^{nd}$ downlink subframe of each frame. The midamble may occupy one OFDM symbol in the $2^{nd}$ downlink subframe. When a subframe consists of 6 OFDM symbols (type-1 subframe), the remaining 5 OFDM symbols may constitute a subframe (type-3 subframe). Further, when a subframe consists of 7 OFDM symbols (type-2 subframe), the remaining 6 OFDM symbols may constitute a subframe (type-1 subframe)

The midamble is transmitted in a sequence format. Various types of sequence may be used as a midamble sequence. In particular, a Golay sequence may be used as the midamble sequence. Table 1 below shows an example of a Golay sequence with a length of 2048 bits.

TABLE 1

| 0xEDE2 | 0xED1D | 0xEDE2 | 0x12E2 | 0xEDE2 | 0xED1D | 0x121D | 0xED1D | 0xEDE2 | 0xED1D | 0xEDE2 | 0x12E2 |
|---|---|---|---|---|---|---|---|---|---|---|---|
| 0x121D | 0x12E2 | 0xEDE2 | 0x12E2 | 0xEDE2 | 0xED1D | 0xEDE2 | 0x12E2 | 0xEDE2 | 0xED1D | 0x121D | 0xED1D |
| 0x121D | 0x12E2 | 0x121D | 0xED1D | 0xEDE2 | 0xED1D | 0x121D | 0xED1D | 0xEDE2 | 0xED1D | 0xEDE2 | 0x12E2 |
| 0xEDE2 | 0xED1D | 0x121D | 0xED1D | 0xEDE2 | 0xED1D | 0xEDE2 | 0x12E2 | 0x121D | 0x12E2 | 0xEDE2 | 0x12E2 |
| 0x121D | 0x12E2 | 0x121D | 0xED1D | 0x121D | 0x12E2 | 0xEDE2 | 0x12E2 | 0xEDE2 | 0xED1D | 0xEDE2 | 0x12E2 |
| 0x121D | 0x12E2 | 0xEDE2 | 0x12E2 | 0xEDE2 | 0xED1D | 0xEDE2 | 0x12E2 | 0xEDE2 | 0xED1D | 0x121D | 0xED1D |
| 0xEDE2 | 0xED1D | 0xEDE2 | 0x12E2 | 0x121D | 0x12E2 | 0xEDE2 | 0x12E2 | 0xEDE2 | 0xED1D | 0xEDE2 | 0x12E2 |
| 0xEDE2 | 0xED1D | 0x121D | 0xED1D | 0x121D | 0x12E2 | 0x121D | 0xED1D | 0xEDE2 | 0xED1D | 0x121D | 0xED1D |
| 0x121D | 0x12E2 | 0x121D | 0xED1D | 0x121D | 0x12E2 | 0xEDE2 | 0x12E2 | 0x121D | 0x12E2 | 0x121D | 0xED1D |
| 0xEDE2 | 0xED1D | 0x121D | 0xED1D | 0xEDE2 | 0xED1D | 0xEDE2 | 0x12E2 | 0xEDE2 | 0xED1D | 0x121D | 0xED1D |
| 0x121D | 0x12E2 | 0x121D | 0xED1D | 0xEDE2 | 0xED1D | 0x121D | 0xED1D | | | | |

A midamble signal s(t) transmitted through each antenna can be determined by Equation 1 below.

$$s(t) = \mathrm{Re}\left\{ e^{j2\pi f_c t} \sum_{k=0}^{k=N_{used}-1} b_k \cdot e^{j2\pi\left(k-\frac{N_{used}-1}{2}\right)\Delta f(t-T_g)} \right\}$$
$$k \neq \frac{N_{used}-1}{2}$$

[Equation 1]

k denotes a subcarrier index, $N_{used}$ denotes the number of subcarriers to which the midamble sequence is mapped, $f_c$ denotes a carrier frequency, $\Delta f$ denotes a subcarrier spacing, and Tg denotes a guard time. $b_k$ denotes a complex coefficient for modulating subcarriers in an OFDM symbol to which the midamble is mapped.

Each antenna's midamble sequence may be transmitted by being allocated to the entire resource region. Alternatively, only a part of the resource region may be used instead of using the entire resource region. By considering a frequency partition or a reuse factor, a subcarrier can be divided for each cell and be transmitted by mapping a midamble sequence. For example, if the reuse factor is 3, each cell uses only ⅓ of distributed or contiguous subcarriers among subcarriers allocated to the midamble sequence and reserves the remaining subcarriers for a midamble sequence of another cell. In this case, a subcarrier to be allocated to a midamble sequence of each cell may have various structures. For example, among all subcarriers, a first cell, a second cell, and a third cell may respectively allocate a $3k^{th}$ subcarrier, a $(3k+1)^{th}$ subcarrier, and a $(3k+2)^{th}$ subcarrier (where k=0, 1, . . . ) to the midamble. Further, if the number of antennas for transmitting the midamble sequence of each cell is N, each cell can allocate N contiguous subcarriers to the midamble sequence. For example, if the reuse factor is 3 and the number of antennas for transmitting the midamble sequence is N, the first cell allocates N contiguous subcarriers to the midamble sequence and reserves 2N subcarriers for midamble sequences of the second cell and the third cell. Subcarriers are respectively allocated to the midamble sequences of the second cell and the third cell, and N contiguous subcarriers are re-allocated to the midamble sequence of the first cell.

The midamble sequence of each antenna may be multiplexed by using various types of multiplexing schemes in a frequency domain. The midamble sequence of each antenna may be multiplexed by using at least one of frequency division multiplexing (FDM), code division multiplexing (CDM), and a hybrid scheme of FDM/CDM. In case of using the FDM, subcarriers constituting a resource region are respectively allocated to a plurality of antennas, and midamble sequences are respectively mapped to subcarriers allocated to the respective antennas. The subcarriers are allocated to the plurality of antennas in various manners. In case of using the CDM, midamble sequences of the respective antennas are mapped to the same subcarrier while having different codes. The reuse factor may also be used when the midamble sequences of the respective antennas are multiplexed.

In addition, the midamble sequences may be allocated in a unit of one subband, instead of being allocated to the entire resource region. One subband may include 4 contiguous PRUs, and one PRU may include 18 subcarriers. Therefore, the midamble sequence may have a length of 72. When the midamble sequence is allocated in a subband unit, a sequence length is shorter than that allocated in the entire resource region, and thus midamble detection capability may decrease. However, since the midamble sequence allocated to each subband is transmitted by applying transmit power of a frequency partition including a corresponding subband, an interference level of a neighbor cell can be more correctly measured.

FIG. 10 shows an example of a midamble structure in which a midamble sequence of each antenna is mapped to a resource region by being multiplexed using FDM. A reuse factor of 3 is used to distinguish neighbor cells. Each cell may transmit a midamble sequence by selecting one of three midamble structures A, B, and C. In each midamble structure, the midamble sequence is multiplexed using the FDM by the number of antennas of a cell, and the midamble structure is repeated in a subband unit. A midamble structure in case of using a ½ subband is shown in FIG. 10. FIG. 10A shows an example of a midamble structure when using 4 transmit antennas. In midamble structures A, B, and C, midamble sequences of the respective antennas are mapped with a spacing of 12 subcarriers. FIG. 10B shows an example of a midamble structure when using 2 transmit antennas. In midamble structures A, B, and C, midamble sequences of the respective antennas are mapped with a spacing of 6 subcarriers.

Although it is shown in FIG. 10 that the midamble sequences of the respective antennas are mapped with a specific subcarrier spacing, a location of the subcarrier allocated to each antenna may change. A preamble occupies one OFDM symbol, and a UE can detect the preamble by using correlation. When the midamble structure is similar to a preamble structure, the UE may mistakenly detect the midamble by regarding the midamble as the preamble. Therefore, the midamble structure needs to be modified.

Figure 11:
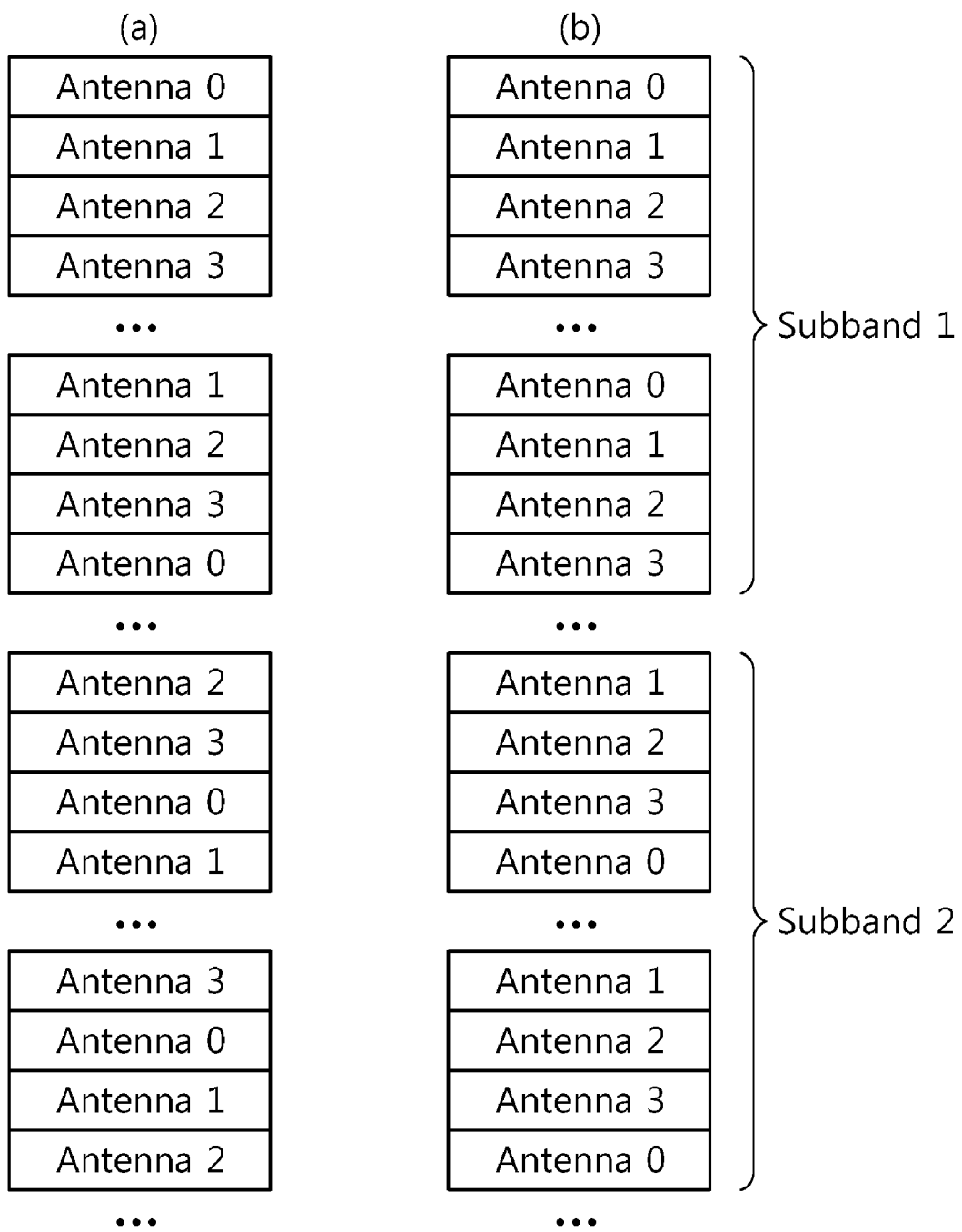
FIG. 11 to FIG. 12 show an example of a midamble structure in which midamble sequences of respective antennas are mapped to a resource region by performing tone rotation.

FIG. 11 shows an example of a midamble structure in which midamble sequences of respective antennas are mapped to a resource region by performing tone rotation. Due to the tone rotation, a subcarrier spacing may change instead of mapping the midamble sequence of the respective antennas with a specific subcarrier spacing. A location of a subcarrier usable in each cell and the number of subcarriers are fixed according to a reuse factor.

In FIG. 11A, the tone rotation is performed for a midamble sequence of each antenna. In FIG. 11B, the tone rotation is performed for a subband to which the midamble sequence of each antenna is mapped. A location of the subcarrier to which the midamble sequence is mapped may be shifted by one subcarrier through a plurality of subcarriers corresponding to the number of antennas. Among subcarriers indicated in FIG. 11, a subcarrier to which a midamble sequence of another antenna is mapped may exist, or a resource reserved for another neighbor cell having a different reuse factor may exist.

Figure 12:
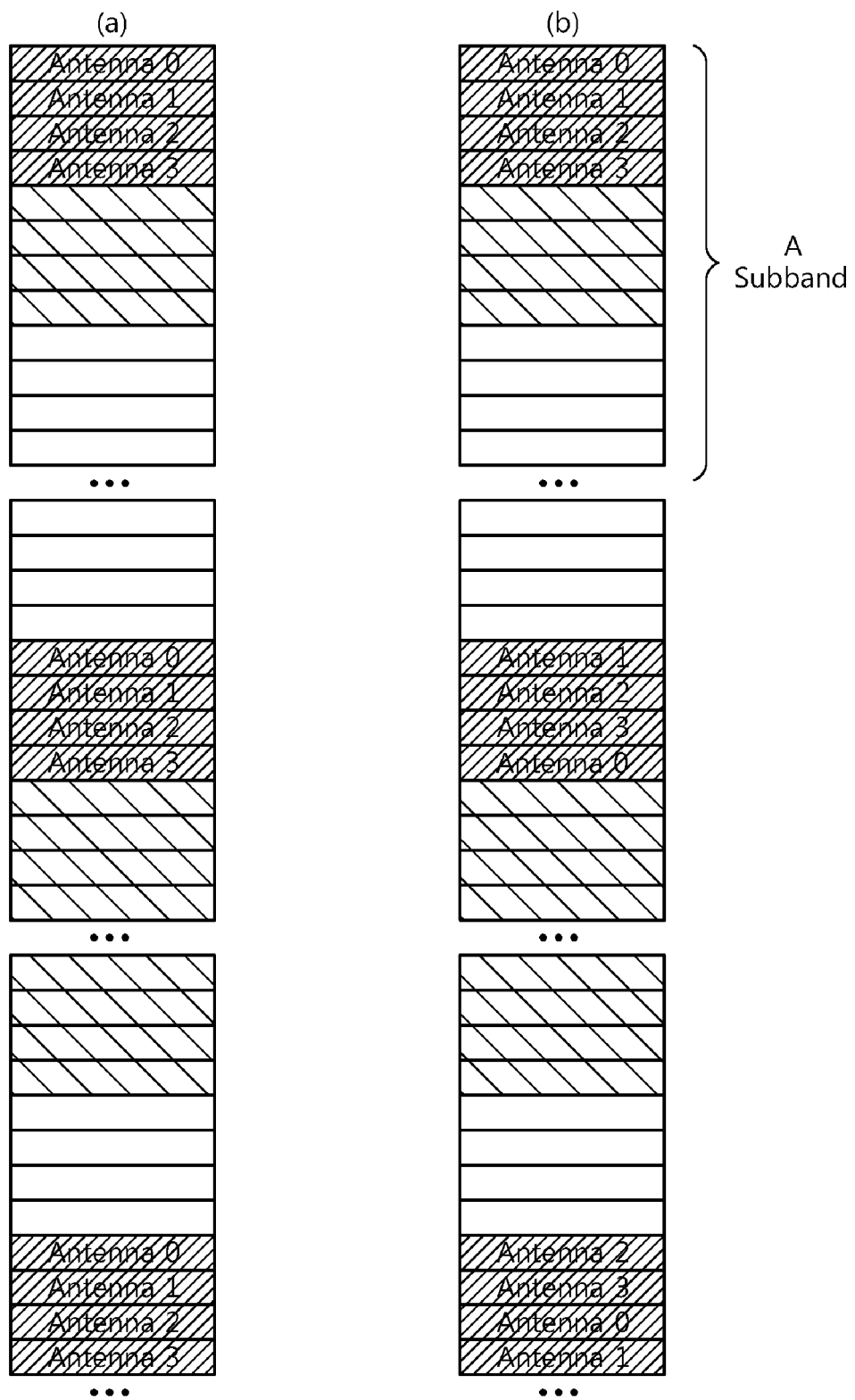

FIG. 12 shows another example of a midamble structure in which midamble sequences of respective antennas are mapped to a resource region by performing tone rotation. The midamble structure based on the tone rotation shown in FIG. 11 may not be enough to distinguish a preamble and a midamble. Therefore, a location of a subcarrier to which a midamble sequence is mapped may be rearranged by considering up to a reuse factor. That is, a location of a subcarrier to be allocated to each cell according to the reuse factor may be shifted or rotated in a frequency domain.

FIG. 12A shows an example of a case where a location of a subcarrier is rearranged according to a reuse factor. Although a midamble sequence of each antenna is not rearranged by tone rotation, a location to which the midamble sequence is mapped changes in a subband unit. That is, according to a subband index, midamble sequences of reuse regions 0, 1, and 2, midamble sequences of reuse regions 1, 2, and 0, midamble sequences of reuse regions 2, 0, and 1, and so on are sequentially mapped. FIG. 12B shows an example of a case where a location of a subcarrier is rearranged by considering a reuse factor and tone rotation. In FIG. 12B, the location of the subcarrier is rearranged according to the reuse factor in a subband unit, and a location of a subcarrier to which each midamble sequence is mapped is shifted or rotated by using the tone rotation. Although the location of the subcarrier to which the midamble sequence is mapped is rearranged by considering the reuse factor in the subband unit in FIG. 12, a unit of considering the reuse factor is not limited to the subband unit. For example, the subcarrier may be rearranged by applying the reuse factor in every 12 subcarriers (i.e., the number of antennas (4)×the reuse factor (3)).

The midamble structure described in FIG. 10 to FIG. 12 can be expressed by the following equations. In a basic midamble structure in which the reuse factor is 3 and subcarrier rearrangement is not applied by considering the tone rotation or the reuse factor, an index of a subcarrier to which the midamble sequence is mapped can be determined by Equation 2.

$$k = 3 \cdot Nt \cdot s + a + Nt \cdot (BSID \bmod 3) \quad \text{[Equation 2]}$$

k denotes an index of a subcarrier to which a midamble sequence is mapped, Nt denotes the number of antennas, s denotes a sequence index, a denotes an antenna index, and BSID denotes a cell ID.

Equation 3 expresses a midamble structure in which tone rotation is applied to the basic midamble structure of Equation 2.

$$k = 3 \cdot Nt \cdot s + f(a, \text{subband}) + Nt \cdot (BSID \bmod 3), \quad \text{[Equation 3]}$$

$$f(a, \text{subband}) = (a + s_i) \bmod Nt$$

k denotes an index of a subcarrier to which a midamble sequence is mapped, Nt denotes the number of antennas, s denotes a sequence index, a denotes an antenna index, BSID denotes a cell ID, and $s_i$ denotes a subband index. In comparison with Equation 2, tone rotation is applied based on the subband index $s_i$.

Equation 4 expresses a midamble structure in which subcarrier rearrangement considering a reuse factor is applied to the basic midamble structure of Equation 2.

$$k = 3 \cdot Nt \cdot s + f(a, \text{subband}, \text{reuse\_factor}) + Nt \cdot (BSID \bmod 3) \quad \text{[Equation 4]}$$

k denotes an index of a subcarrier to which a midamble sequence is mapped, Nt denotes the number of antennas, s denotes a sequence index, a denotes an antenna index, and BSID denotes a cell ID. In comparison with Equation 2, the subcarrier is rearranged based on the reuse factor.

Equation 5 expresses the midamble structure of FIG. 12A, as an example of Equation 4.

$$f(a, \text{subband}, \text{reuse\_factor}) = (a + s_i \cdot Nt) \bmod N_{sb} \quad \text{[Equation 5]}$$

$N_{sb}$ denotes the number of subcarriers belonging to a subband.

Equation 6 expresses the midamble structure of FIG. 12B, as another example of Equation 4.

$$f(a, \text{subband}, \text{reuse\_factor}) = ((a + s_i) \bmod Nt + s_i \cdot Nt) \bmod N_{sb} \quad \text{[Equation 6]}$$

$N_{sb}$ denotes the number of subcarriers belonging to a subband.

When expressing up to a location of a subcarrier to which a midamble sequence is mapped and a sequence to be applied, the coefficient $b_k$ of Equation 1 above can be specified by Equation 7.

$$b_k = \begin{cases} 1 - 2 \cdot G([k + u + \text{offset}_D(fft)] \bmod fft), & \text{[Equation 7]} \\ \quad \text{when } k \neq \dfrac{N_{used} - 1}{2}, \\ k \bmod (3 \times N_t) = \\ \left(g + \left\lfloor \dfrac{k - s}{N_1 \times N_{sc}} \right\rfloor \right) \bmod N_t + N_t \times (BSID \bmod 3) \\ 0, \text{ when otherwise} \end{cases}$$

k denotes a subcarrier index ($0 \leq k \leq N_{used} - 1$), $N_{used}$ denotes the number of subcarriers to which a midamble sequence is mapped, Nt denotes the number of transmit antennas, G(x) denotes a Golay sequence ($0 \leq x < 2047$) having a length of 2048 bits defined in Table 1, fft denotes an FFT size, and BSID denotes a cell ID. u denotes a shift value ($0 \leq u \leq 127$), and can be determined by u=mod(BSID, 128).

$\text{offset}_D(fft)$ is an offset value which differs depending on an FFT size. Table 2 shows an offset value depending on the FFT size.

TABLE 2

| FFT size | Offset |
|---|---|
| 2048 | 30 |
| 1024 | 60 |
| 512 | 40 |

Further, g denotes a transmit antenna index, and s denotes a parameter that varies depending on k, where s=0 when $k \leq (N_{used} - 1)/2$, and s=1 when $k > (N_{used} - 1)/2$. According to the subcarrier index calculated by Equation 7 above, the midamble structure of FIG. 10 to FIG. 12 can be determined.

Meanwhile, if a plurality of contiguous cells have a different number of antennas, a level of interference received from a neighbor cell by each antenna may differ depending on a location at which a midamble sequence is mapped to a subcarrier. For example, this is a case where a femto cell exists in the coverage of a macro cell.

Figure 13:
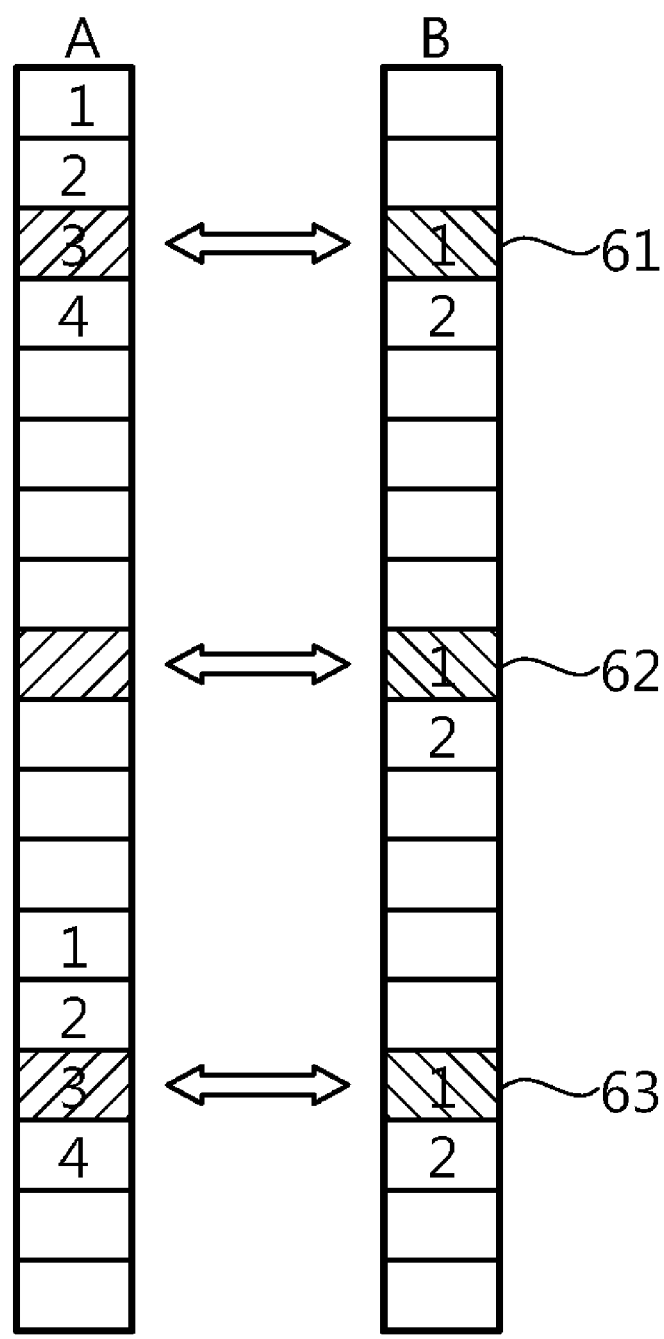
FIG. 13 shows an example of a case where midamble sequences of a cell having 4 antennas and a cell having 2 antennas act as interference to each other.

FIG. 13 shows an example of a case where midamble sequences of a cell having 4 antennas and a cell having 2 antennas act as interference to each other. A first cell having 4 antennas transmits a midamble sequence by using the midamble structure A of FIG. 10A. A second cell having 2 antennas transmits a midamble sequence by using the midamble structure B of FIG. 10B. In this case, a first antenna of the second cell has an interference level that varies depending on a location of a subcarrier to which a midamble sequence is mapped. For example, at a first location 61 and a third location 63, interference influenced by a midamble sequence transmitted from a third antenna of the first cell exists. However, at a second location 62, there is no interference since a midamble sequence of the first cell is not transmitted. That is, interference from a neighbor cell may exist or not exist according to a subcarrier location, and thus correct channel measurement is difficult. Further, as to the midamble sequence of the first cell, the first antenna and the second antenna do not experience interference from the second cell, whereas the third antenna and the fourth antenna experience interference from the second cell. In particular, interference cancellation is more difficult in case of a signal without orthogonality.

In addition, if the number of antennas is 8 and FDM is used as a multiplexing scheme, a spacing of subcarriers to which a midamble sequence is mapped increases, and thus midamble estimation capability may decrease. Therefore, there is a need to combine another multiplexing scheme other than the FDM.

Accordingly, a midamble structure having the same pattern can be designed irrespective of the number of antennas. In this case, a plurality of antennas may be multiplexed by combining FDM/CDM schemes or by combining FDM/time division multiplexing (TDM) schemes.

Figure 14:
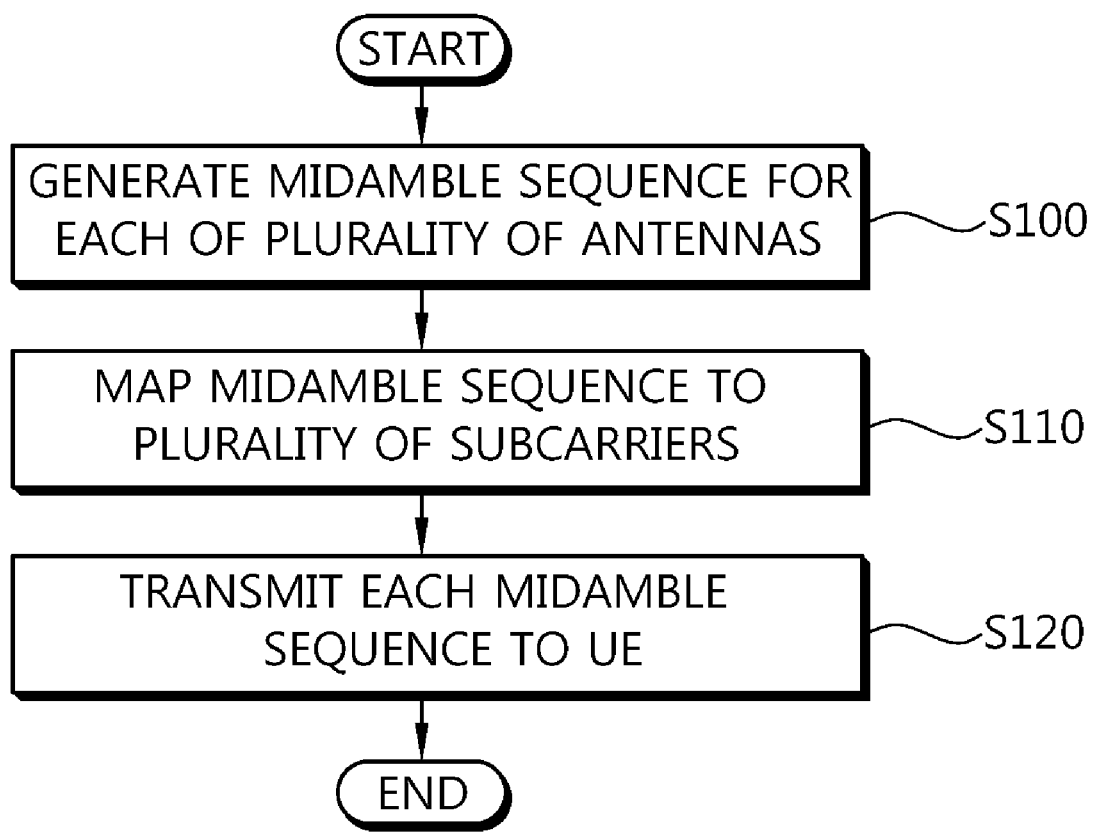
FIG. 14 is a flowchart showing a midamble transmission method according to an embodiment of the present invention.

FIG. 14 is a flowchart showing a midamble transmission method according to an embodiment of the present invention.

In step S100, a BS generates a midamble sequence for each of a plurality of antennas. In step S110, the BS maps each midamble sequence to a subcarrier in a resource region in a unit of subband including 72 contiguous subcarriers. The respective midamble sequences are multiplexed in the resource region. A location of a subcarrier to which each midamble sequence is mapped is fixed in one subband irrespective of the number of antennas. Further, the midamble sequences may be shifted and mapped along a frequency domain in each subband. In step S120, the BS transmits the midamble sequences to the respective antennas to a UE.

Hereinafter, the proposed midamble transmission method of FIG. 14 will be described according to an embodiment of the present invention.

A plurality of antennas can be multiplexed by combining FDM/CDM schemes.

FIG. 15 to FIG. 17 show an example of a midamble structure according to the proposed midamble transmission method. FIG. 15 shows an example of a midamble structure for a cell having 2 antennas. FIG. 16 shows an example of a midamble structure for a cell having 4 antennas. FIG. 17 shows an example of a midamble structure for a cell having 8 antennas. On the basis of the midamble structure for a case where the number of antennas is 4, the midamble structure for cases where the number of antennas is 2 and 8 may be designed. In the cases of FIG. 15 to FIG. 17, a midamble sequence for each antenna is allocated in a unit of 12 subcarriers. Referring to FIG. 16, the midamble structure for the cell having 4 antennas is the same as the midamble structure of FIG. 10A. Referring to FIG. 15, the midamble structure for the cell having 2 antennas has a structure in which a $3^{rd}$ antenna (i.e., an antenna 2) and a $4^{th}$ antenna (i.e., an antenna 3) are absent in the midamble structure with 4 antennas of FIG. 16. Referring to FIG. 17, the midamble structure for the cell having 8 antennas is constructed such that a $1^{st}$ to a $4^{th}$ antenna (i.e., an antenna 0 to an antenna 3) are multiplexed using CDM with a $5^{th}$ antenna to an $8^{th}$ antenna (i.e., an antenna 4 to an antenna 7) in the midamble structure with 4 antennas of FIG. 16. This is because, when only the FDM is used as a multiplexing scheme, a spacing of subcarriers to which a midamble sequence is mapped increases and thus midamble estimation capability may decrease. Although it is exemplified in FIG. 17 that the $1^{st}$ and $5^{th}$ antennas, the $2^{nd}$ and $6^{th}$ antennas, the $3^{rd}$ and $7^{th}$ antennas, and the $4^{th}$ and $8^{th}$ antennas are multiplexed with each other by using the CDM, any two antennas may be multiplexed in pair using the CDM. Further, although it is exemplified in FIG. 15 to FIG. 17 that each reuse region is sequentially repeated by using a reuse factor of 3, subcarrier rearrangement may be performed by considering the reuse factor or the tone rotation described in FIG. 11 and FIG. 12. That is, although reuse regions 0, 1, and 2 are repetitively arranged sequentially in an ascending order of a subcarrier index in FIG. 15 to FIG. 17, the reuse regions may be arranged in a different order, such as, 0, 1, 2, 1, 2, 0, 2, 0, 1, and so on. Further, although it is exemplified in FIG. 15 to FIG. 17 that a midamble sequence for each antenna is mapped with a specific spacing of 12 subcarriers, a mapping location of each antenna may change to avoid periodicity in a time axis. For example, although antennas 0, 1, 2, and 3 are repeated sequentially in a reuse region 0 of FIG. 16, the antenna may be mapped in a different order, such as, antennas 0, 1, 2, and 3, antennas 1, 2, 3, and 0, and so on.

When an antenna is multiplexed using the CDM as shown in FIG. 17, there is a need to use an orthogonal sequence as a midamble sequence. Since the midamble sequence is generated in a unit of one subband, the orthogonal sequence is also generated in a unit of one subband. When the number of transmit antennas is 8, 6 subcarriers are allocated for each antenna in one subband, and thus 6 orthogonal sequences having a length of 6 may exist. When the number of antennas is 2 or 4, one of the 6 orthogonal sequences may be selected to be used as the midamble sequence. When the number of antennas is 8, two of the 6 orthogonal sequences may be selected to be used as the midamble sequence. In this case, one sequence may be a midamble sequence for $1^{st}$ to $4^{th}$ antennas, and the other sequence may be a midamble sequence for $5^{th}$ to $8^{th}$ antennas. However, when orthogonality between midamble sequences is not maintained in a subband, midamble estimation capability may decrease.

An orthogonal sequence used by each cell may be directly signaled by each cell to UEs, or may be selected by defining a rule as shown in Equation 8.

$$i_{seq} = (BSID) \bmod (N_{seq}/\lceil N_{tx}/4 \rceil) + 3 \cdot \lfloor i_{tx}/4 \rfloor \qquad \text{[Equation 8]}$$

$N_{seq}$ denotes the number of midamble sequences, and $i_{seq}$ denotes a midamble sequence index. $N_{tx}$ denotes the number of transmit antennas of a BS, and $i_{tx}$ denotes a transmit antenna index.

Meanwhile, a plurality of antennas may be multiplexed by combining FDM/TDM schemes. The combination of the FDM/TDM schemes may be applied when the number of transmit antennas is 8. When using the 8 antennas, $1^{st}$ to $4^{th}$ antennas and $5^{th}$ to $8^{th}$ antennas may be multiplexed using the TDM. For example, a midamble sequence for the $1^{st}$ to $4^{th}$ antennas and a midamble sequence for the $5^{th}$ to $8^{th}$ antennas may be alternately transmitted one by one. If a midamble is transmitted with a period of 5 ms in principle, when the TDM is used as a multiplexing scheme, a midamble for each antenna may be transmitted with a period of 10 ms. Alternatively, the midamble transmitted with a period of 5 ms may be allocated to the 1st to 4th antennas, and a location at which the midamble for the 5th to 8th antennas is transmitted may be newly defined. The location at which the midamble for the 5th antenna to the 8th antenna is transmitted may be fixed or may be reported to a UE by using broadcasting.

FIG. 18 shows another example of a midamble structure according to the proposed midamble transmission method. This is a case where the number of antennas is 8 and a reuse factor of 1 is used instead of a reuse factor of 3.

Figure 19:
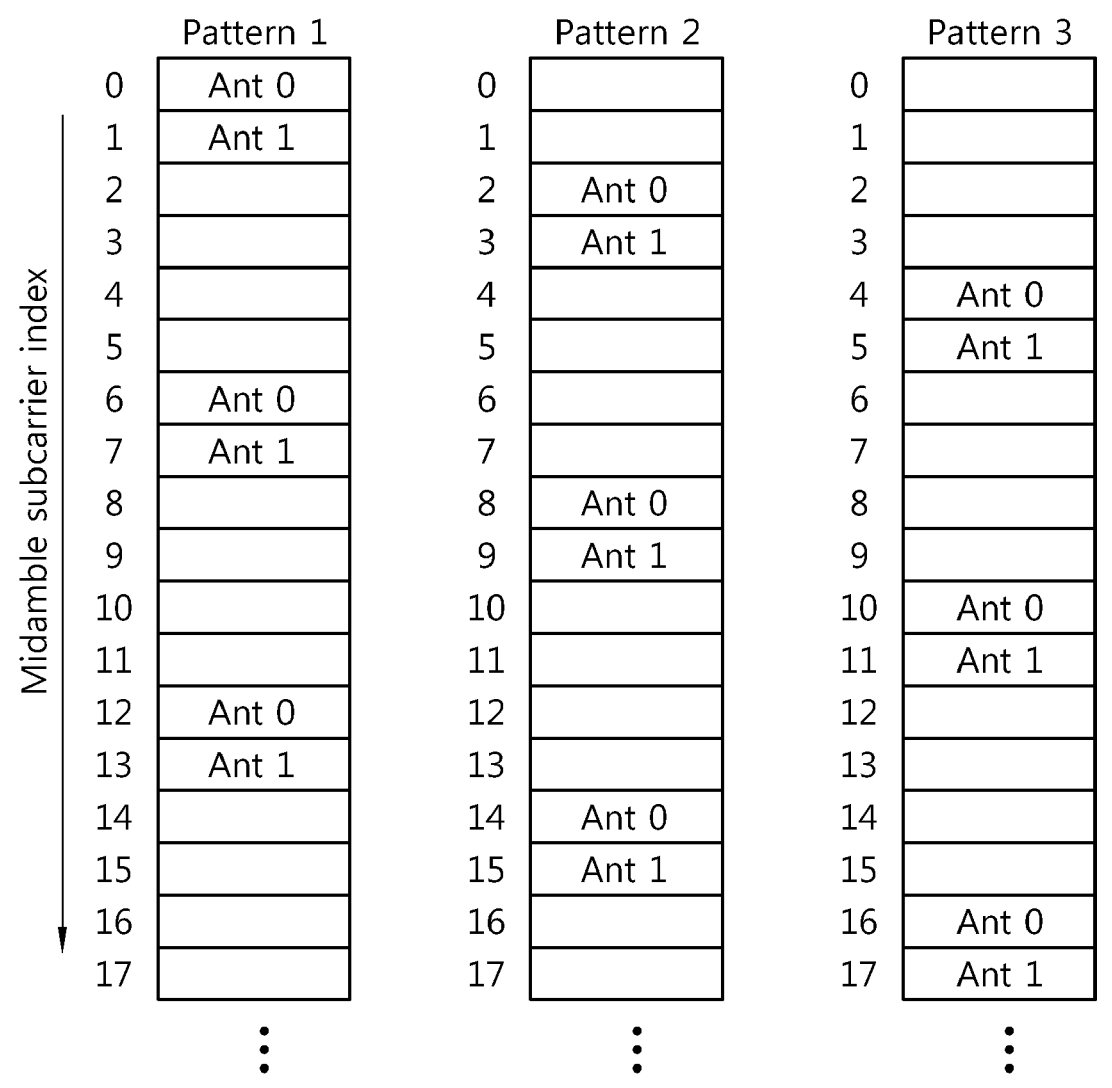

FIG. 19 to FIG. 21 show another example of a midamble structure according to the proposed midamble transmission method. FIG. 19 shows an example of a midamble structure for a cell having 2 antennas. FIG. 20 shows an example of a midamble structure for a cell having 4 antennas. FIG. 21 shows an example of a midamble structure for a cell having 8 antennas. In the cases of FIG. 19 to FIG. 21, a midamble sequence for each antenna is allocated in a unit of 6 subcarriers. Referring to FIG. 19, in a cell having 2 antennas, a 1st antenna (i.e., an antenna 0) and a 2nd antenna (i.e., an antenna 1) are multiplexed using FDM, and a midamble sequence for each antenna is allocated in a unit of 6 subcarriers. Referring to FIG. 20, the midamble of the cell having 4 antennas is constructed by multiplexing a 1st antenna and a 3rd antenna (i.e., an antenna 0 and an antenna 2) respectively with a 2nd antenna and a 4th antenna (i.e., an antenna 1 and an antenna 3) by using CDM. A subcarrier multiplexed using the CDM is re-multiplexed using the FDM. Referring to FIG. 21, the midamble of the cell having 8 antennas is constructed by multiplexing a 1st antenna, a 3rd antenna, a 5th antenna, and a 7th antenna (i.e., an antenna 0, an antenna 2, an antenna 4, and an antenna 6) respectively with a 2nd antenna, a 4th antenna, a 6th antenna, and an 8th antenna (i.e., an antenna 1, an antenna 3, an antenna 5, and an antenna 7) by using the CDM. A subcarrier multiplexed using the CDM is re-multiplexed using the FDM. Antennas of various combinations in FIG. 20 and FIG. 21 can be multiplexed using the CDM. For example, when using 4 antennas, 1st and 2nd antennas and 3rd and 4th antennas may be respectively multiplexed using the CDM, and when using 8 antennas, 1st to 4th antennas may be multiplexed respectively with 5th to 8th antennas by using the CDM.

In addition, instead of using the FDM/CDM combination as the multiplexing scheme, FDM/TDM combination may be used for multiplexing of each antenna. When using 4 transmit antennas, 1st and 2nd antennas and 3rd and 4th antennas may be multiplexed using the TDM. For example, a midamble sequence for the 1st and 2nd antennas and a midamble sequence for the 3rd and 4th antennas may be alternately transmitted one by one. If a midamble is transmitted with a period of 5 ms in principle, when the TDM is used as a multiplexing scheme, a midamble for each antenna may be transmitted with a period of 10 ms. Alternatively, the midamble transmitted with a period of 5 ms may be allocated to the 1st and 2nd antennas, and a location at which the midamble for the 3rd and 4th antennas may be newly defined. When using 8 transmit antennas, similarly to the midamble structure of FIG. 19, 1st/2nd antennas, 3rd/4th antennas, 5th/6th antennas, and 7th/8th antennas may be multiplexed respectively using the TDM, or similarly to the midamble structure of FIG. 20, 1st to 4th antennas and 5th to 8th antennas may be multiplexed using the TDM. Antennas can be combined variously when multiplexing of the TDM is applied.

Figure 22:
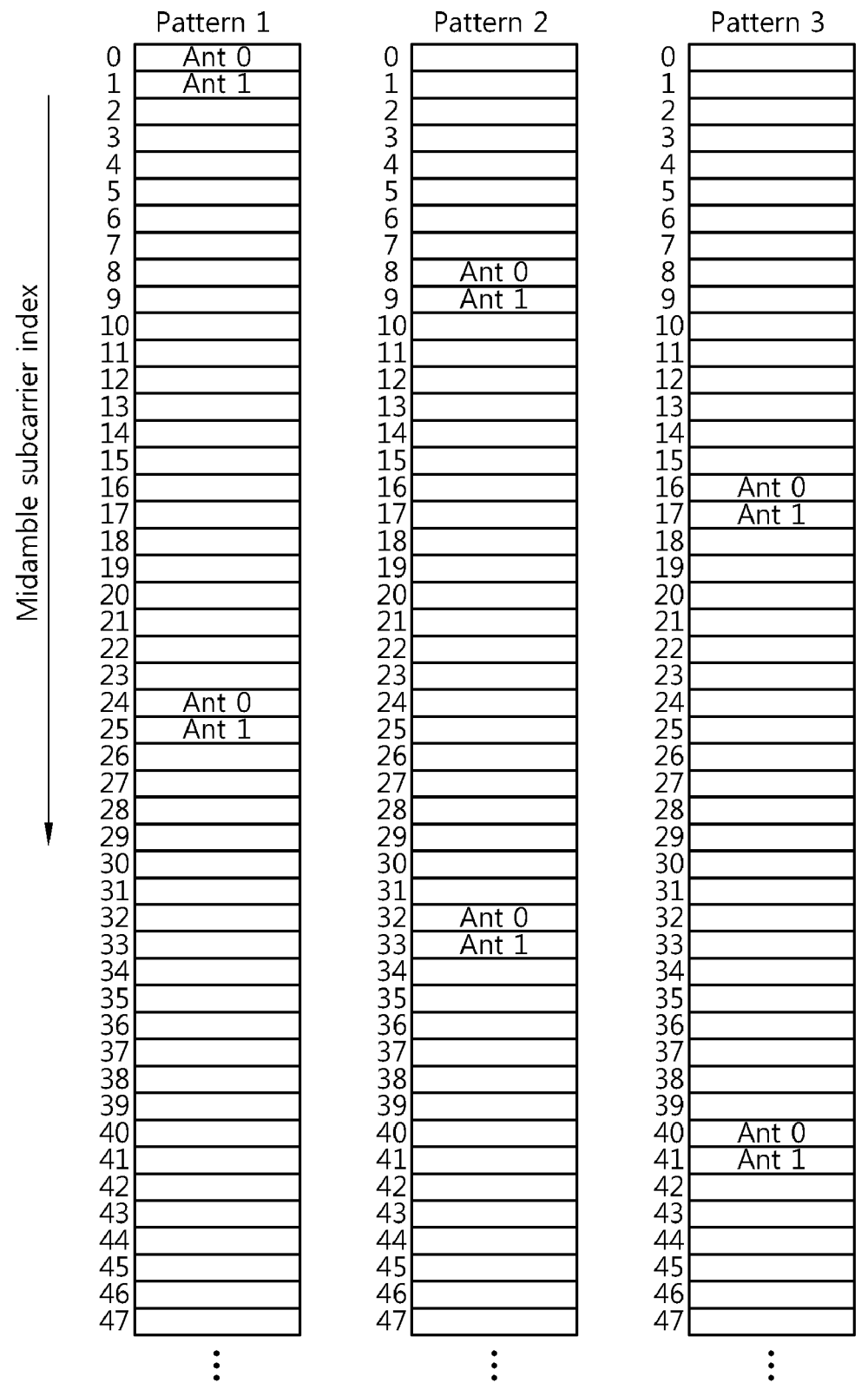

FIG. 22 to FIG. 24 show another example of a midamble structure according to the proposed midamble transmission method. FIG. 22 shows an example of a midamble structure for a cell having 2 antennas. FIG. 23 shows an example of a midamble structure for a cell having 4 antennas. FIG. 24 shows an example of a midamble structure for a cell having 8 antennas. FIG. 22 to FIG. 24 show a case where a midamble sequence for each antenna is allocated in a unit of 24 subcarriers. In FIG. 22 to FIG. 24, a subcarrier to which a midamble sequence of each antenna is mapped is multiplexed using the FDM.

According to Equation 9, an index of a subcarrier to which a midamble sequence is mapped in the midamble structure of FIG. 15 to FIG. 24 can be defined. Equation 9 is a variation of Equation 7.

$$b_k = \begin{cases} 1 - 2 \cdot G([k + u + \mathit{offset}_D(\mathit{fft})] \bmod \mathit{fft}), & \text{[Equation 9]} \\ \text{when } k \neq \frac{N_{used} - 1}{2}, \\ k \bmod(3 \times N_p) = \left(g + \left\lfloor \frac{k-s}{N_1 \times N_{sc}} \right\rfloor\right) \bmod N_t + \\ N_p \times (\mathit{BSID} \bmod 3) \\ 0, \text{ when otherwise} \end{cases}$$

k denotes a subcarrier index ($0 \leq k \leq N_{used}-1$), $N_{used}$ denotes the number of subcarriers to which a midamble sequence is mapped, Nt denotes the number of transmit antennas, G(x) denotes a Golay sequence ($0 \leq x < 2047$) having a length of 2048 bits defined in Table 1, fft denotes an FFT size, and BSID denotes a cell ID. u denotes a shift value ($0 \leq u \leq 127$), and can be determined by u=mod(BSID, 128). $\mathit{offset}_D(\mathit{fft})$ is an offset value which differs depending on the FFT size of Table 2. g denotes a transmit antenna index, and s denotes a parameter that varies depending on k, where s=0 when $k \leq (N_{used}-1)/2$, and s=1 when $k > (N_{used}-1)/2$. $N_p$ may be 4 in the midamble structure of FIG. 15 to FIG. 17, may be 2 in the midamble structure of FIG. 19 to FIG. 21, and may be 8 in the midamble structure of FIG. 22 to FIG. 24. The coefficient $b_k$ determined by Equation 9 may be multiplied by a coefficient considering transmit power of a midamble.

Figure 25:
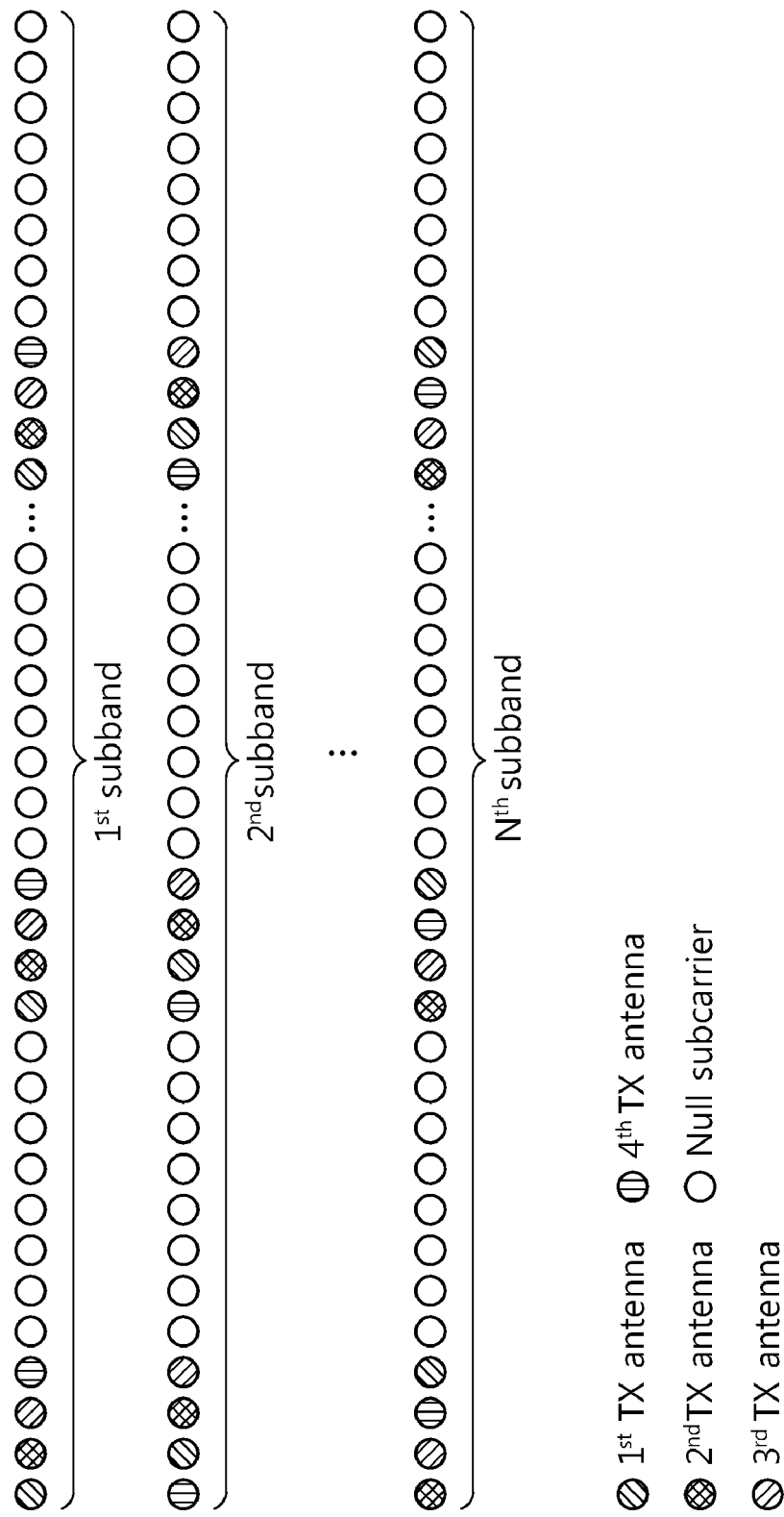

FIG. 25 shows another example of a midamble structure according to the proposed midamble transmission method. The midamble structure of FIG. 25 shows a case where Nt=4, Np=4, and BSID=0 in Equation 9.

If Np=8 in Equation 9, a spacing of subcarriers to which a midamble sequence is mapped is 24 subcarriers. To compensate for the decrease of midamble subcarrier density, a coefficient for transmit power that varies depending on the number of antennas may be multiplied in Equation 9. Equation 10 is a variation of Equation 9.

$$b_k = \begin{cases} \sqrt{\frac{24 \cdot 10^{0.2}}{N_t}} \cdot \{1 - 2 \cdot G([k + u + \mathit{offset}_D(\mathit{fft})] \bmod \mathit{fft})\}, & \text{[Equation 10]} \\ \text{when } k \neq \frac{N_{used} - 1}{2}, \\ k \bmod 24 = \left(g + \left\lfloor \frac{k-s}{N_1 \times N_{sc}} \right\rfloor\right) \bmod N_t + 8 \times (\mathit{BSID} \bmod 3) \\ 0, \text{ when otherwise} \end{cases}$$

Figure 26:
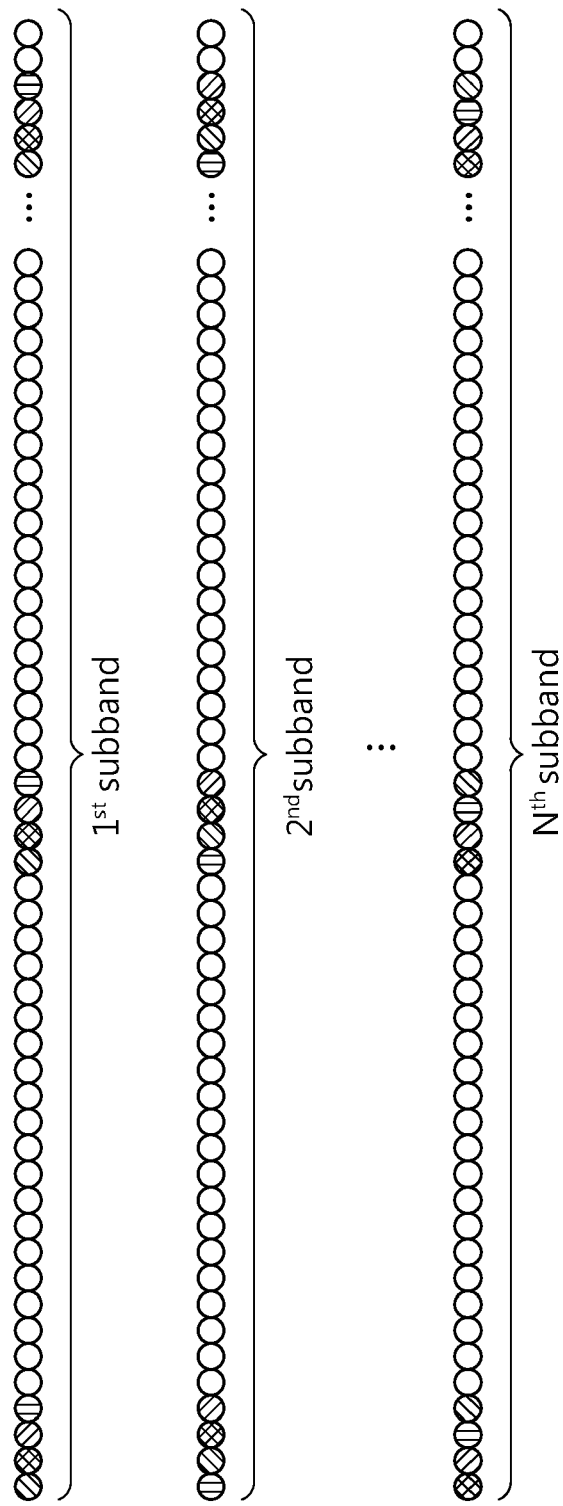

FIG. 26 shows another example of a midamble structure according to the proposed midamble transmission method. The midamble structure of FIG. 26 shows a case where Nt=4 and BSID=0 in Equation 10.

FIG. 27 to FIG. 30 show capability of a midamble structure according to the proposed midamble transmission method with respect to the conventional midamble structure.

Figure 27:
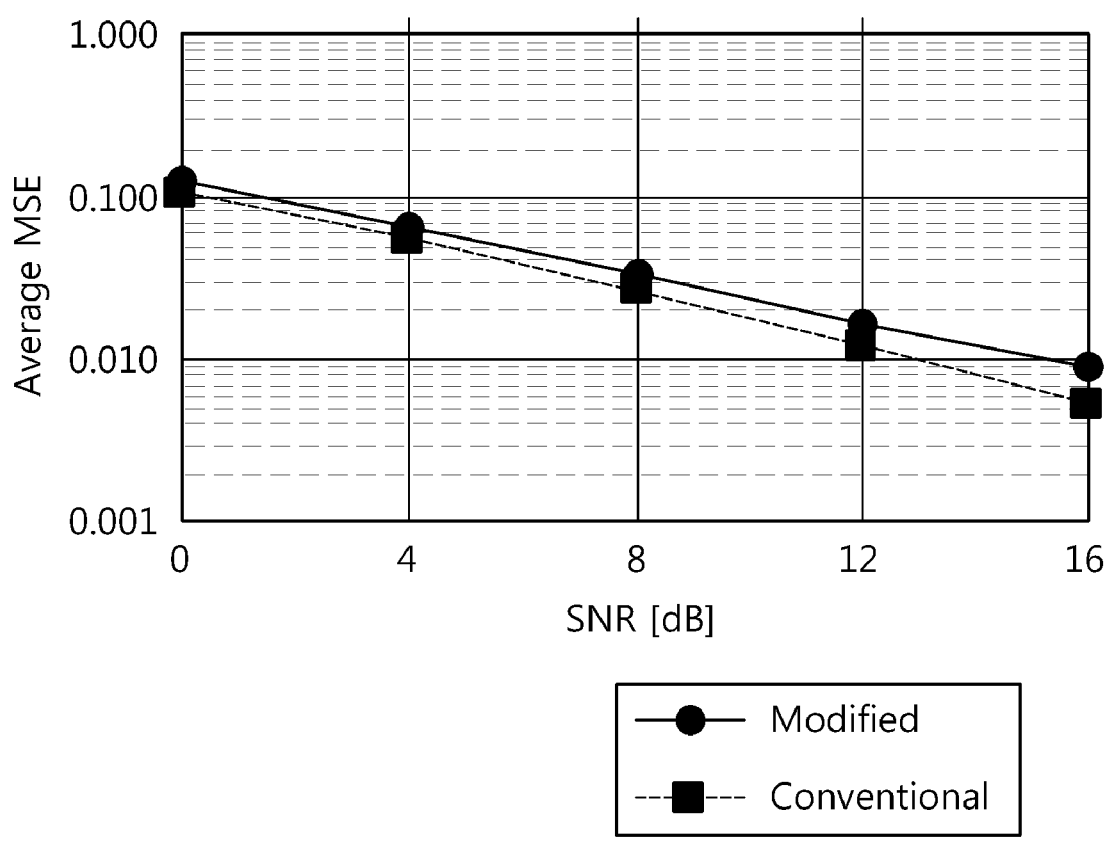
FIG. 27 to FIG. 30 shows capability of a midamble structure according to the proposed midamble transmission method with respect to the conventional midamble structure.
Figure 28:
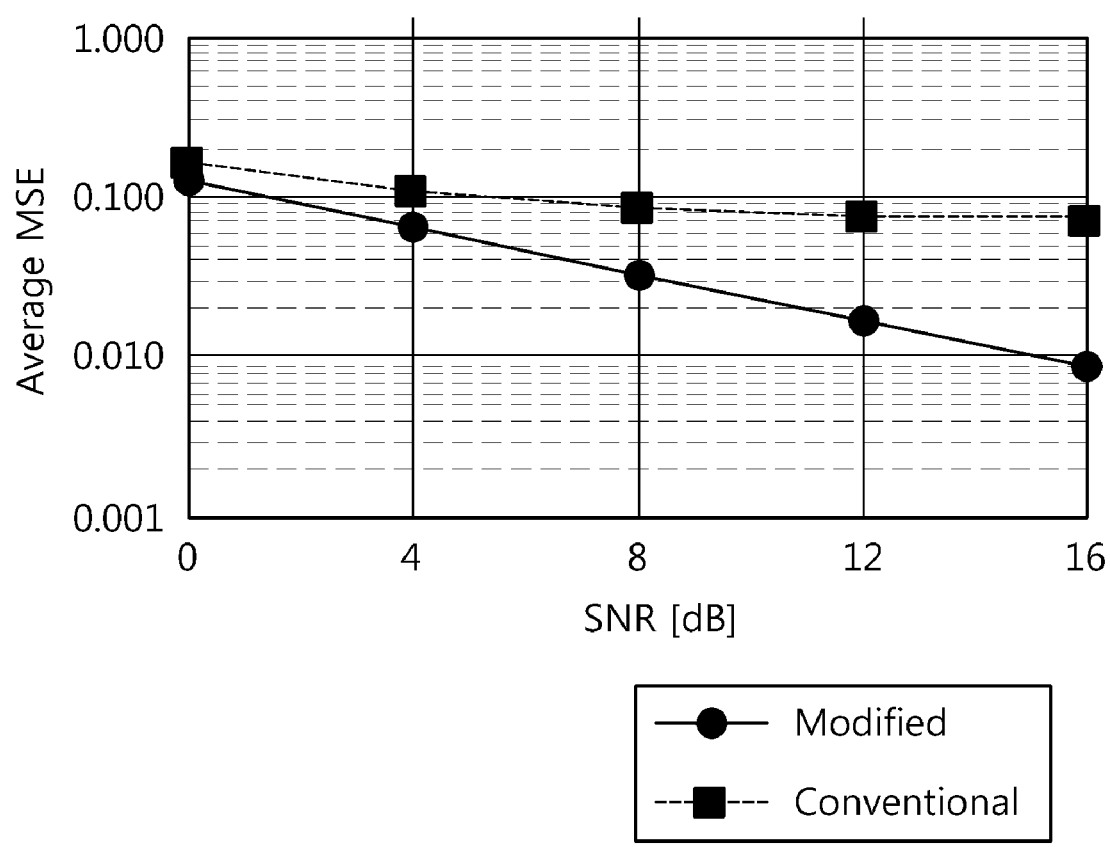
Figure 29:
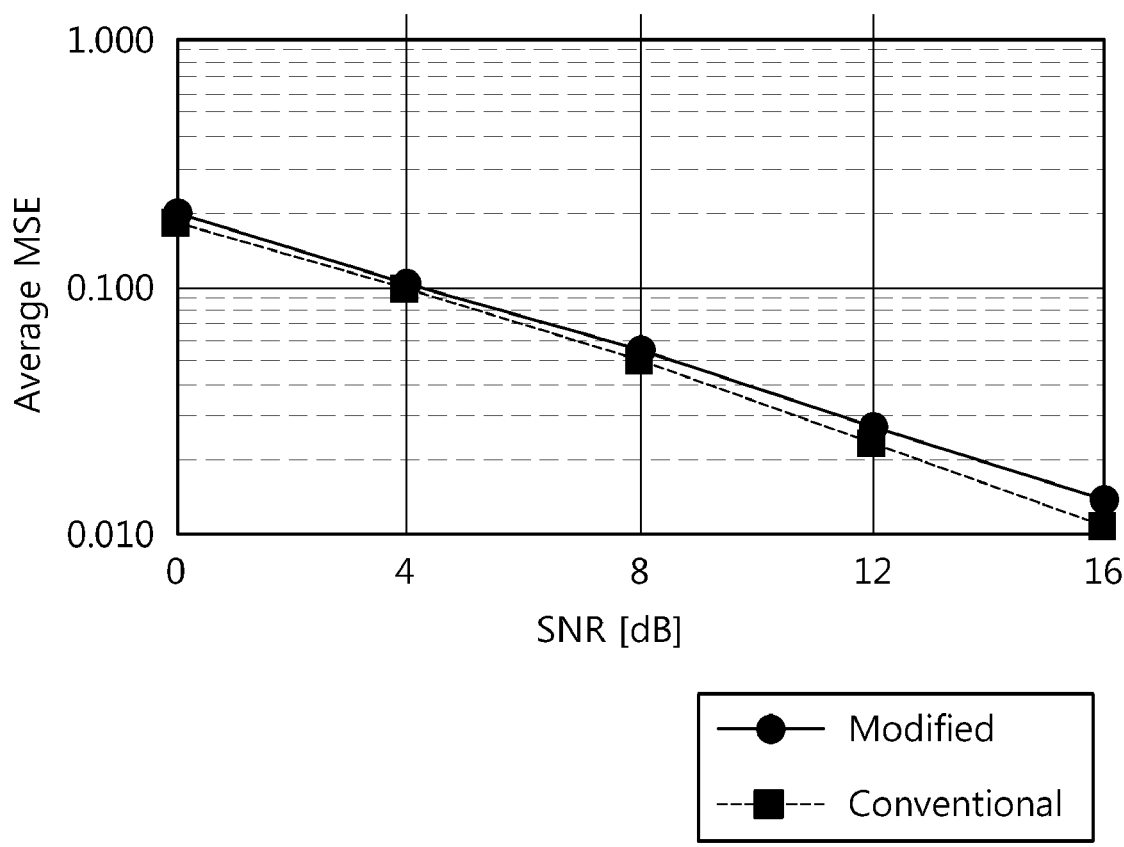
Figure 30:
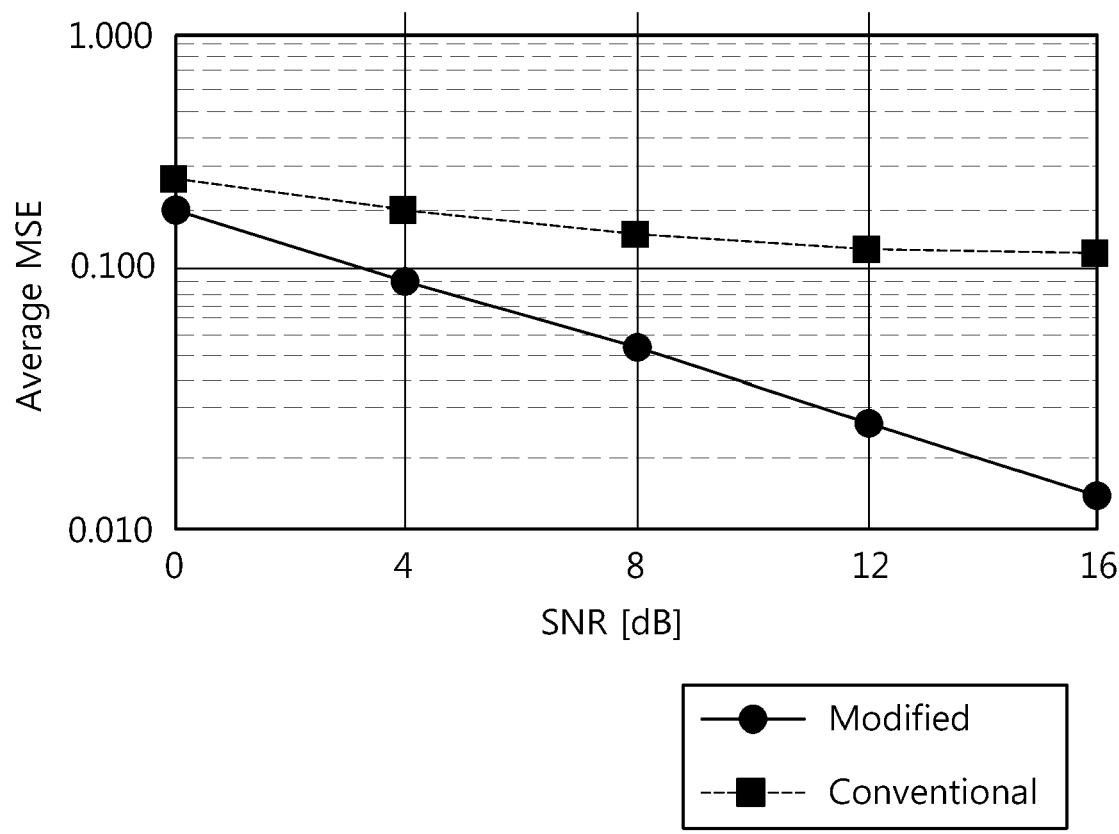

Graphs shown in FIG. 27 to FIG. 30 represent a mean square error (MSE) of a channel estimation value with respect to a signal-to-noise ratio (SNR). A signal-to-interference ratio (SIR) is fixed to 0 dB. FIG. 27 shows a case where a serving cell and a neighbor cell both use 2 antennas. FIG. 28 shows a case where a serving cell uses 2 antennas and a neighbor cell uses 4 antennas. FIG. 29 shows a case where a serving cell and a neighbor cell both use 4 antennas. FIG. 30 shows a case where a serving cell uses 4 antennas and a neighbor cell uses 2 antennas. In case of FIG. 27 and FIG. 29, the conventional midamble structure is not much different from the midamble structure according to the proposed midamble transmission method. However, in case of FIG. 28 and FIG. 30, an MSE of a channel estimation value decreases in the midamble structure according to the proposed midamble transmission method. That is, if the number of antennas of the serving cell is different from the number of antennas in the neighbor cell, channel estimation capability can be improved when using the midamble structure according to the proposed midamble transmission method.

Equation 11 shows another exemplary equation for determining a location of a midamble subcarrier according to the proposed midamble transmission method. Equation 11 can be applied when Nt is 2 or 4. A subcarrier to which a midamble sequence is mapped can be allocated with a spacing of 12 subcarriers.

$$b_k = \begin{cases} \sqrt{\dfrac{24 \cdot 10^{0.2}}{N_t}} \cdot \{1 - 2 \cdot G([k + u + \mathit{offset}_D(\mathit{fft})]\bmod \mathit{fft})\}, \\ \text{when } k \neq \dfrac{N_{used} - 1}{2}, \\ k \bmod 12 = \left(g + \left\lfloor \dfrac{k - s}{N_1 \times N_{sc}} \right\rfloor\right) \bmod N_t + 4 \times (BSID \bmod 3) \\ 0, \text{ when otherwise} \end{cases} \quad \text{[Equation 11]}$$

Equation 12 shows another exemplary equation for determining a location of a midamble subcarrier according to the proposed midamble transmission method. Equation 12 can be applied when Nt is 8. A subcarrier to which a midamble sequence is mapped can be allocated with a spacing of 24 subcarriers.

$$b_k = \begin{cases} \sqrt{\dfrac{24 \cdot 10^{0.2}}{N_t}} \cdot \{1 - 2 \cdot G([k + u + \mathit{offset}_D(\mathit{fft})]\bmod \mathit{fft})\}, \\ \text{when } k \neq \dfrac{N_{used} - 1}{2}, \\ k \bmod 24 = \left(g + \left\lfloor \dfrac{k - s}{N_1 \times N_{sc}} \right\rfloor\right) \bmod 4 + \\ 4 \times (BSID \bmod 3) + 12 \cdot \lfloor g/4 \rfloor \\ 0, \text{ when otherwise} \end{cases} \quad \text{[Equation 12]}$$

Equation 9 to Equation 12 show a case where midamble sequences of a plurality of antennas in one reuse region are mapped to contiguous subcarriers. That is, a reuse factor is applied after considering the number of transmit antennas. For example, when 4 transmit antennas and a reuse factor of 3 are applied, midamble sequence of $1^{st}$ to $4^{th}$ antennas of a reuse region 0 are mapped to contiguous subcarriers, followed by midamble sequences of $1^{st}$ to $4^{th}$ antennas of a reuse region 1 and midamble sequences of $1^{st}$ to $4^{th}$ antennas of a reuse region 2.

Equation 13 to Equation 21 below show a case where consecutive subcarriers are respectively allocated to a plurality of reuse regions and midamble sequences of respective transmit antennas are sequentially mapped to distributed subcarriers allocated to each reuse region. That is, a reuse factor is first applied and then the number of transmit antennas is considered. For example, when using 4 transmit antennas and a reuse factor of 3, midamble sequences of a $1^{st}$ antenna of a reuse region 0, a $1^{st}$ antenna of a reuse region 1, and a $1^{st}$ antenna of a reuse region 2 are respectively mapped to consecutive subcarriers, followed by midamble sequences of a $2^{nd}$ antenna of the reuse region 0, a $2^{nd}$ antenna of the reuse region 1, and a $2^{nd}$ antenna of the reuse region 2, in that order.

Figure 31:
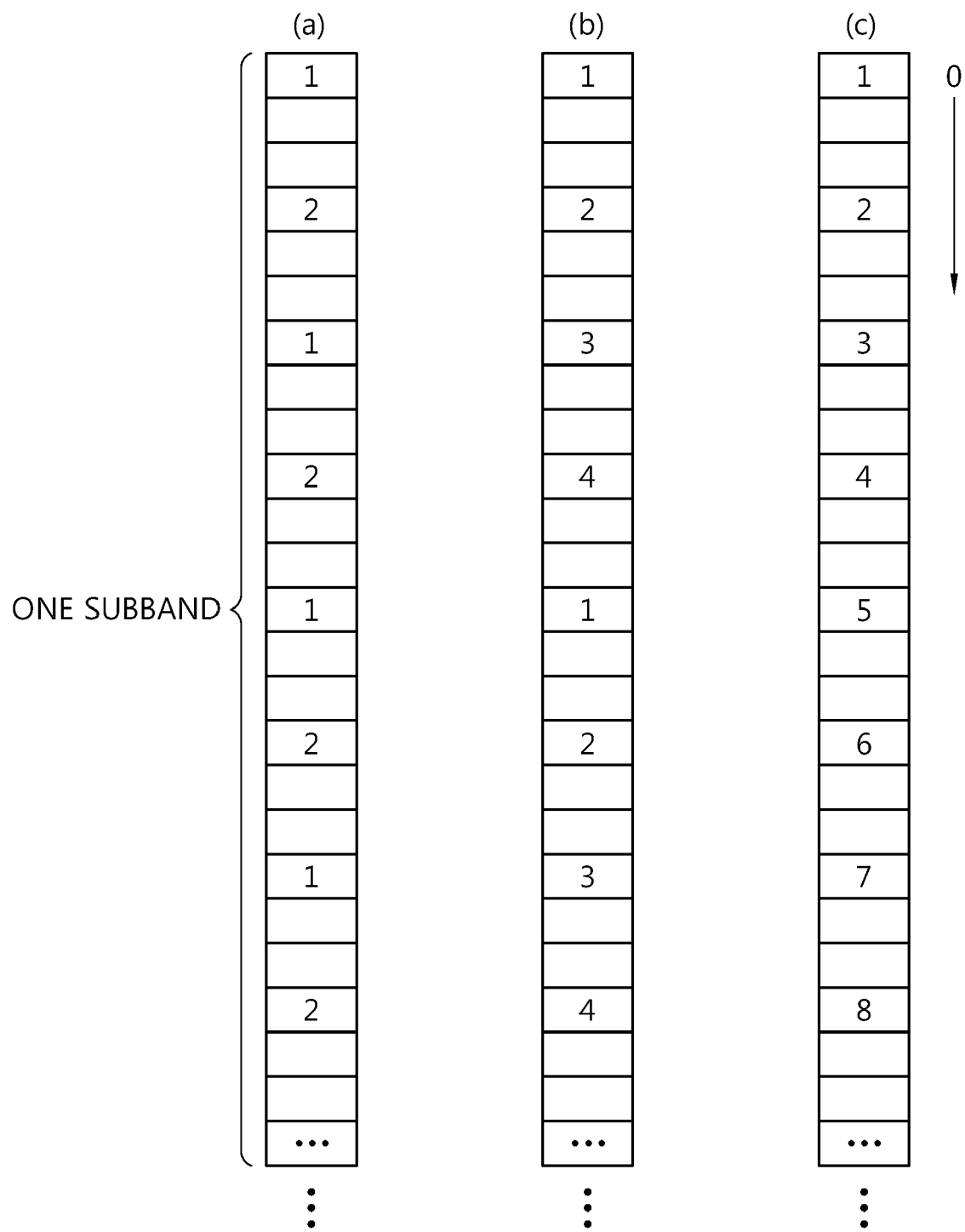
FIG. 31 to FIG. 38 shows another example of a midamble structure according to the proposed midamble transmission method.

Equation 13 is another exemplary equation for determining a location of a midamble subcarrier according to the proposed midamble transmission method. Equation 13 shows a case where antenna shift or frequency shift is not applied in each subband. FIG. 31 shows an example of a midamble structure based on Equation 13. FIG. 31A shows a case of using 2 antennas. FIG. 31B shows a case of using 4 antennas. FIG. 31C shows a case of using 8 antennas.

$$b_k = \begin{cases} \sqrt{3 \cdot 10^{0.2}} \cdot \{1 - 2 \cdot G([k + u + \mathit{offset}_D(\mathit{fft})]\bmod \mathit{fft})\}, \\ \text{when } k \neq \dfrac{N_{used} - 1}{2}, \\ k \bmod(3 \cdot N_t) = 3 \cdot g + BSID \bmod 3 \\ 0, \text{ when otherwise} \end{cases} \quad \text{[Equation 13]}$$

Figure 32:
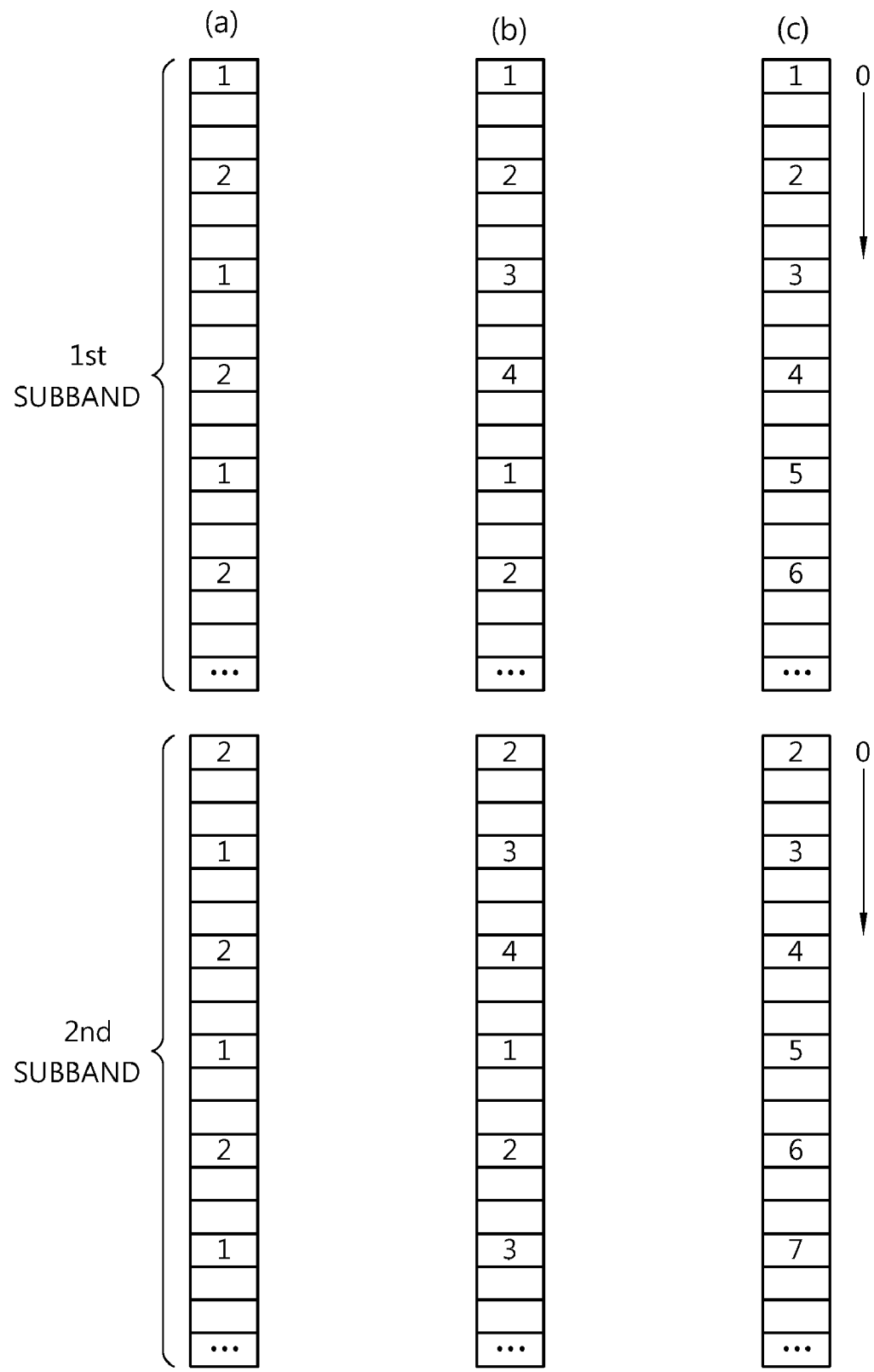

Equation 14 is another exemplary equation for determining a location of a midamble subcarrier according to the proposed midamble transmission method. Equation 14 shows a case where antenna shift is applied in each subband. FIG. 32 shows an example of a midamble structure based on Equation 14. FIG. 32A shows a case of using 2 antennas. FIG. 32B shows a case of using 4 antennas. FIG. 32C shows a case of using 8 antennas.

$$b_k = \begin{cases} \sqrt{3 \cdot 10^{0.2}} \cdot \{1 - 2 \cdot G([k + u + \mathit{offset}_D(\mathit{fft})]\bmod \mathit{fft})\}, \\ \text{when } k \neq \dfrac{N_{used} - 1}{2}, \\ k \bmod(3 \cdot N_t) = 3 \cdot \left(\left(g + \left\lfloor \dfrac{k - s}{N_1 \times N_{sc}} \right\rfloor\right) \bmod N_t\right) + BSID \bmod 3 \\ 0, \text{ when otherwise} \end{cases} \quad \text{[Equation 14]}$$

Figure 33:
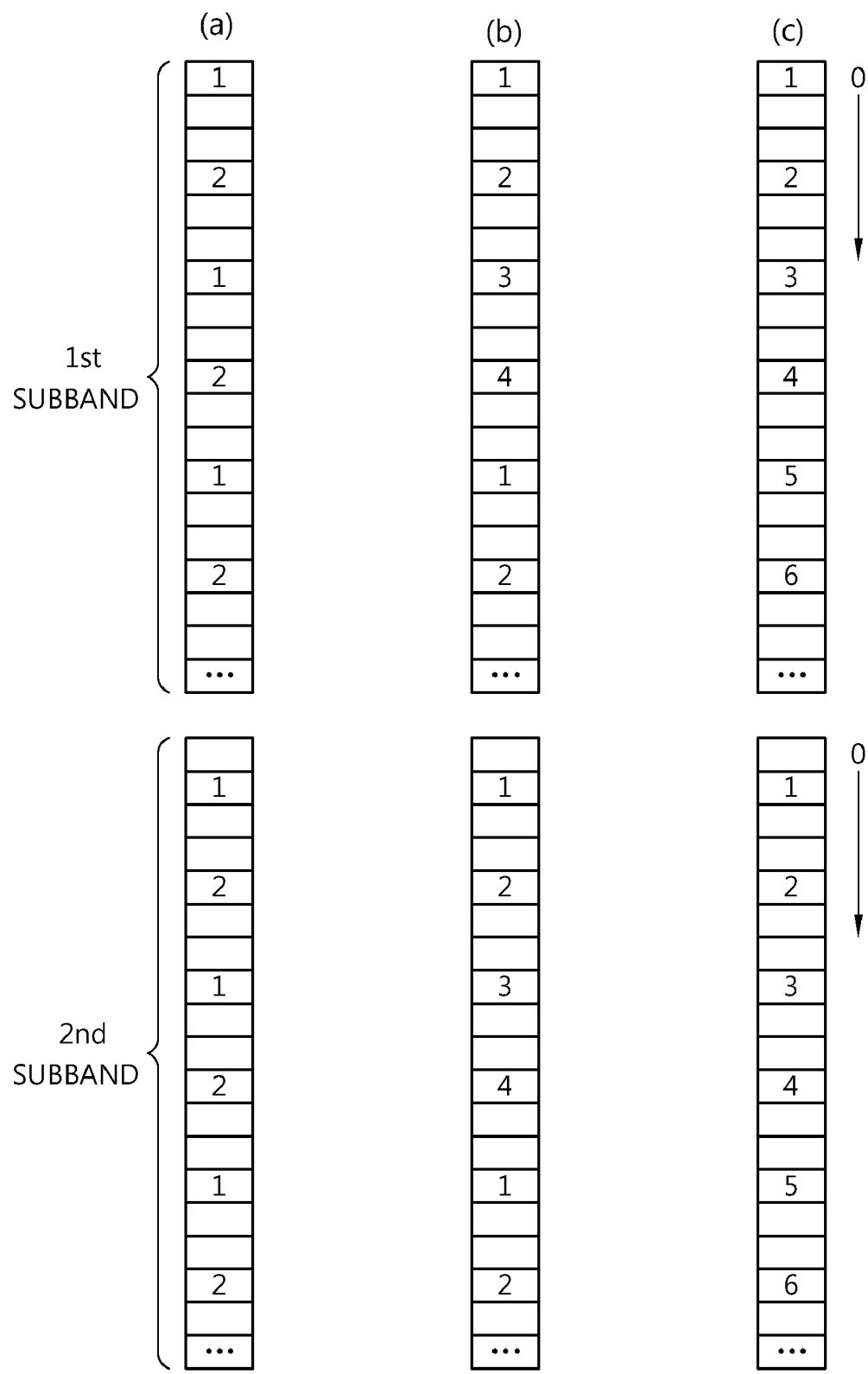

Equation 15 and Equation 16 are another exemplary equation for determining a location of a midamble subcarrier according to the proposed midamble transmission method. Equation 15 and Equation 16 show a case where frequency shift is applied in each subband. FIG. 33 shows an example of a midamble structure based on Equation 15 and Equation 16. FIG. 33A shows a case of using 2 antennas. FIG. 33B shows a case of using 4 antennas. FIG. 33C shows a case of using 8 antennas.

$$b_k = \begin{cases} \sqrt{3 \cdot 10^{0.2}} \cdot \\ \{1 - 2 \cdot G([k + u + \text{offset}_D(\textit{fft})] \mod \textit{fft})\}, \\ \text{when } k \ne \dfrac{N_{used} - 1}{2}, \\ k \mod(3 \cdot N_t) = 3 \cdot g + \left(BSID + \left\lfloor \dfrac{k-s}{N_1 \times N_{sc}} \right\rfloor\right) \mod 3 \\ 0, \text{ when otherwise} \end{cases} \quad \text{[Equation 15]}$$

$$b_k = \quad \text{[Equation 16]}$$

$$\begin{cases} \sqrt{3 \cdot 10^{0.2}} \cdot \\ \{1 - 2 \cdot G([k + u + \text{offset}_D(\textit{fft})] \mod \textit{fft})\}, \\ \text{when } k \ne \dfrac{N_{used} - 1}{2}, \\ (k-s) \mod(3 \cdot N_t) = 3 \cdot g + \left(\left\lfloor \dfrac{BSID}{256} \right\rfloor + \left\lfloor \dfrac{k-s}{N_1 \times N_{sc}} \right\rfloor\right) \mod 3 \\ 0, \text{ when otherwise} \end{cases}$$

k denotes a subcarrier index ($0 \le k \le N_{used}-1$), $N_{used}$ denotes the number of subcarriers to which a midamble sequence is mapped, Nt denotes the number of transmit antennas, G(x) denotes a Golay sequence ($0 \le x < 2047$) having a length of 2048 bits defined in Table 1, fft denotes an FFT size, and BSID denotes a cell ID. u denotes a shift value ($0 \le u \le 127$), and can be determined by u=mod(BSID, 128). $\text{offset}_D(\text{fft})$ is an offset value which differs depending on the FFT size of Table 2. g denotes a transmit antenna index, and s denotes a parameter that varies depending on k, where s=0 when $k \le (N_{used}-1)/2$, and s=1 when $k > (N_{used}-1)/2$.

Figure 34:
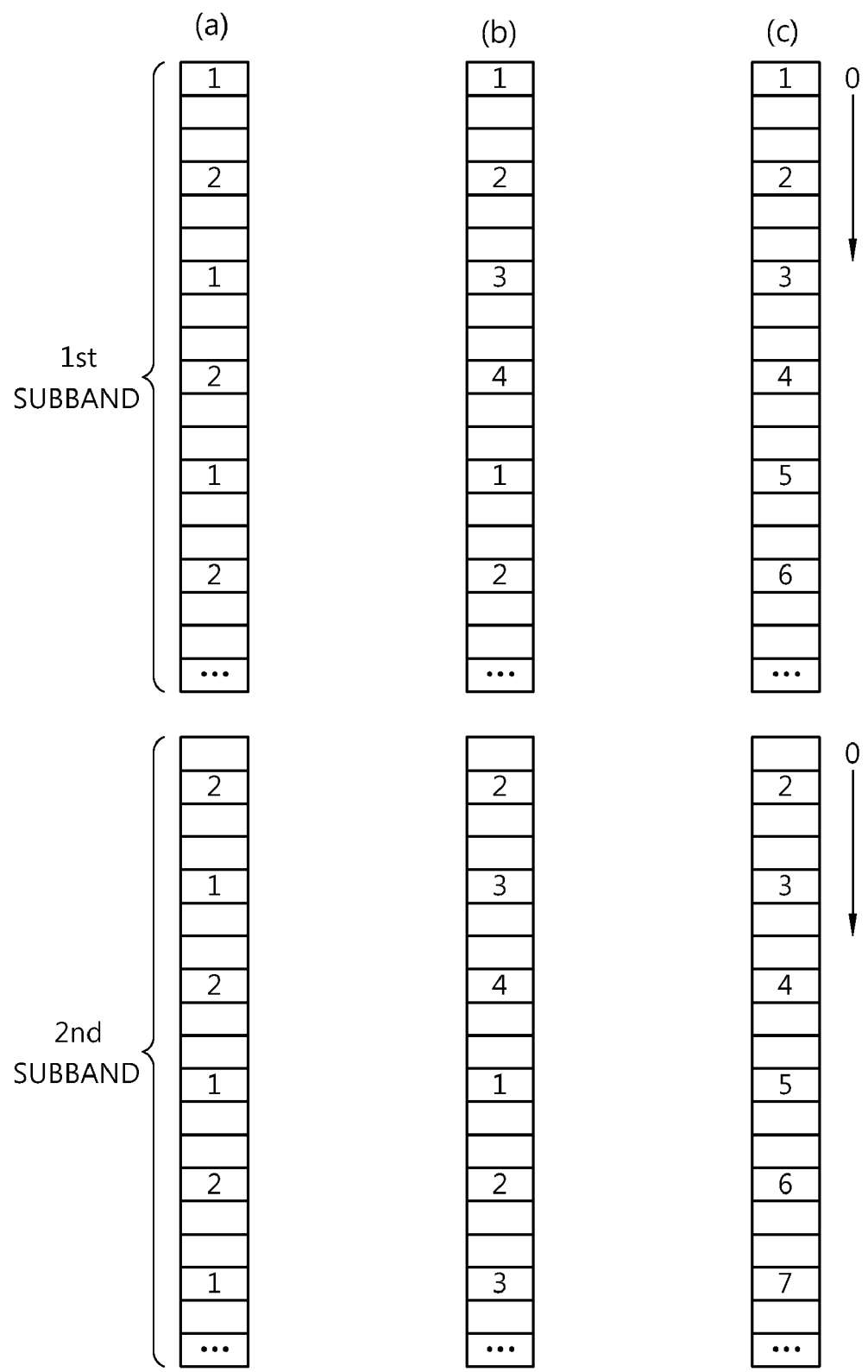

Equation 17 is another exemplary equation for determining a location of a midamble subcarrier according to the proposed midamble transmission method. Equation 17 shows a case where antenna shift and frequency shift is applied in each subband. FIG. 34 shows an example of a midamble structure based on Equation 17. FIG. 34A shows a case of using 2 antennas. FIG. 34B shows a case of using 4 antennas. FIG. 34C shows a case of using 8 antennas.

$$b_k = \begin{cases} \sqrt{3 \cdot 10^{0.2}} \cdot \\ \{1 - 2 \cdot G([k + u + \text{offset}_D(\textit{fft})] \mod \textit{fft})\}, \\ \text{when } k \ne \dfrac{N_{used} - 1}{2}, \\ k \mod(3 \cdot N_t) = 3 \cdot \left(\left(g + \left\lfloor \dfrac{k-s}{N_1 \times N_{sc}} \right\rfloor\right) \mod N_t\right) + \\ \left(BSID + \left\lfloor \dfrac{k-s}{N_1 \times N_{sc}} \right\rfloor\right) \mod 3 \\ 0, \text{ when otherwise} \end{cases} \quad \text{[Equation 17]}$$

Figure 35:
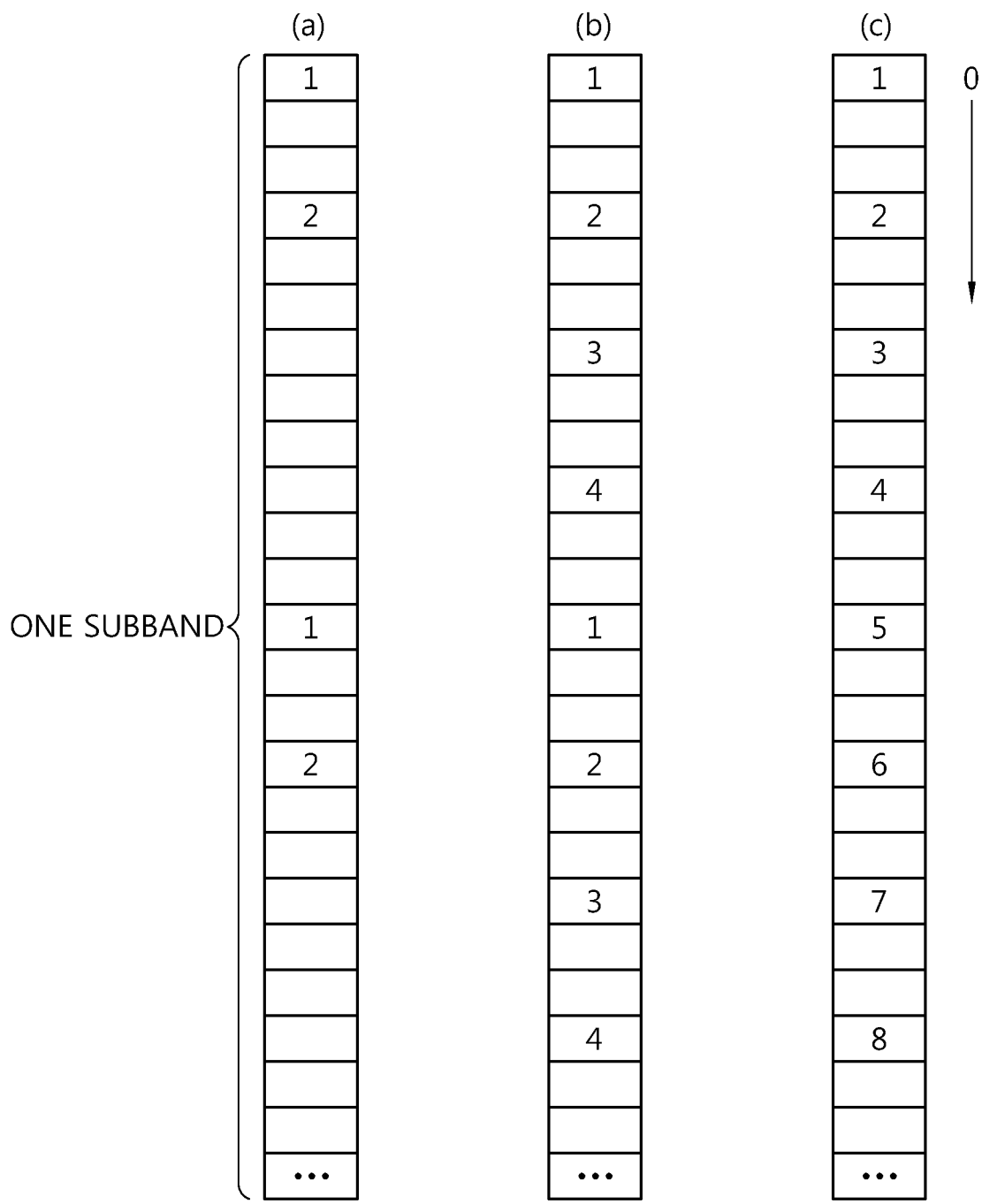

Equation 18 is another exemplary equation for determining a location of a midamble subcarrier according to the proposed midamble transmission method. Equation 18 shows a case where antenna shift or frequency shift is not applied in each subband. In addition, Np is additionally applied as a power transmission parameter depending on the number of antennas in Equation 18. FIG. 35 shows an example of a midamble structure based on Equation 18. FIG. 35A shows a case of using 2 antennas. FIG. 35B shows a case of using 4 antennas. FIG. 35C shows a case of using 8 antennas.

$$b_k = \begin{cases} \sqrt{\dfrac{3 \cdot N_p \, 10^{0.2}}{N_t}} \cdot \\ \{1 - 2 \cdot G([k + u + \text{offset}_D(\textit{fft})] \mod \textit{fft})\}, \\ \text{when } k \ne \dfrac{N_{used} - 1}{2}, \\ k \mod(3 \cdot N_p) = 3 \cdot g + BSID \mod 3 \\ 0, \text{ when otherwise,} \end{cases} \quad \text{[Equation 18]}$$

where $N_p=4$ if $N_t=2$ or 4 and $N_p=8$ if $N_t=8$

Figure 36:
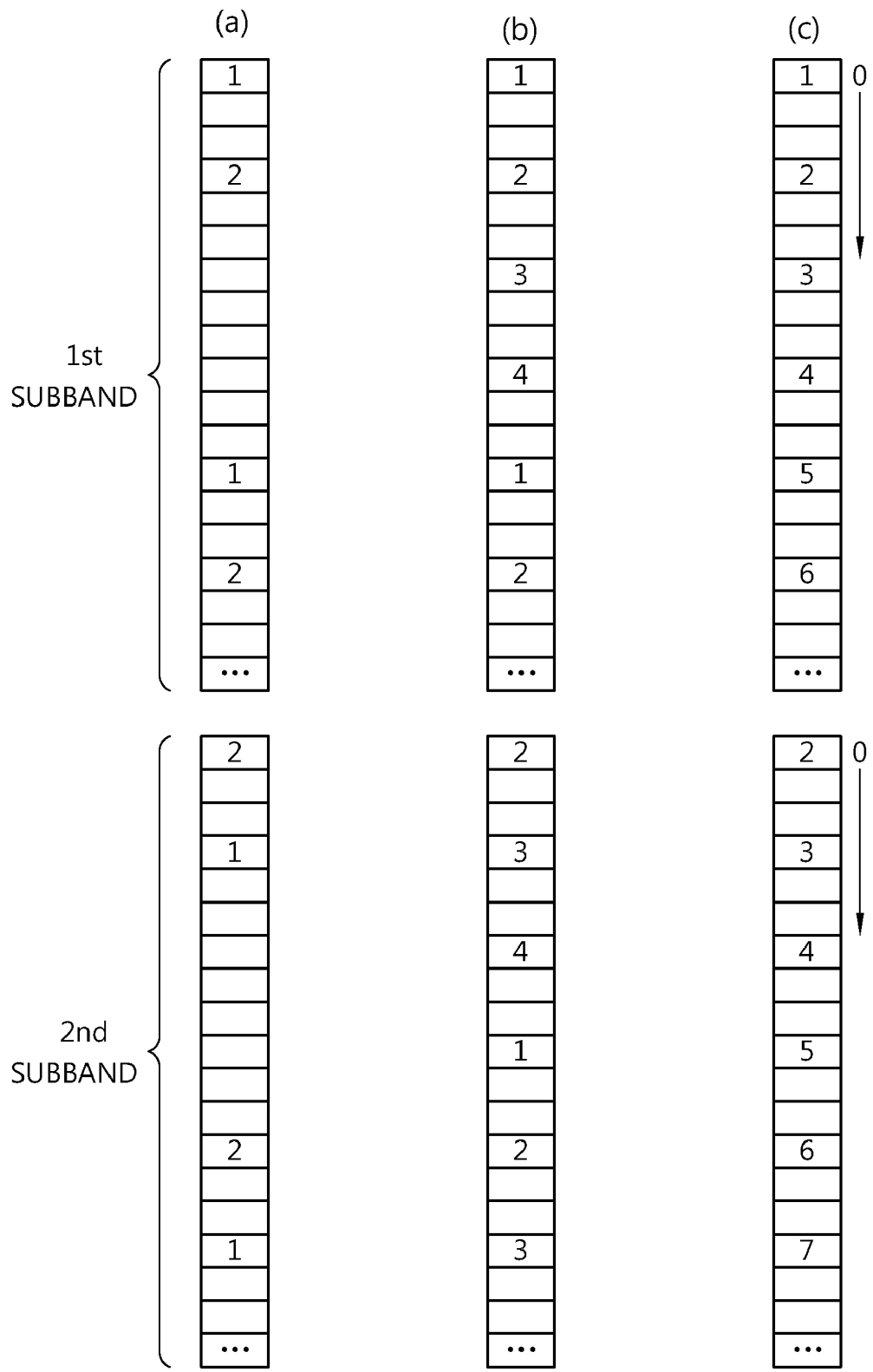

Equation 19 is another exemplary equation for determining a location of a midamble subcarrier according to the proposed midamble transmission method. Equation 19 shows a case where an antenna shift is applied in each subband. In addition, Np is additionally applied as a power transmission parameter depending on the number of antennas in Equation 19. FIG. 36 shows an example of a midamble structure based on Equation 19. FIG. 36A shows a case of using 2 antennas. FIG. 36B shows a case of using 4 antennas. FIG. 36C shows a case of using 8 antennas.

$$b_k = \begin{cases} \sqrt{\dfrac{3 \cdot N_p \, 10^{0.2}}{N_t}} \cdot \\ \{1 - 2 \cdot G([k + u + \text{offset}_D(\textit{fft})] \mod \textit{fft})\}, \\ \text{when } k \ne \dfrac{N_{used} - 1}{2}, \\ k \mod(3 \cdot N_p) = 3 \cdot \left(\left(g + \left\lfloor \dfrac{k-s}{N_1 * N_{sc}} \right\rfloor\right) \mod N_t\right) + \\ BSID \mod 3 \\ 0, \text{ when otherwise,} \end{cases} \quad \text{[Equation 19]}$$

where $N_p=4$ if $N_t=2$ or 4 $N_p=8$ if $N_t=8$

Figure 37:
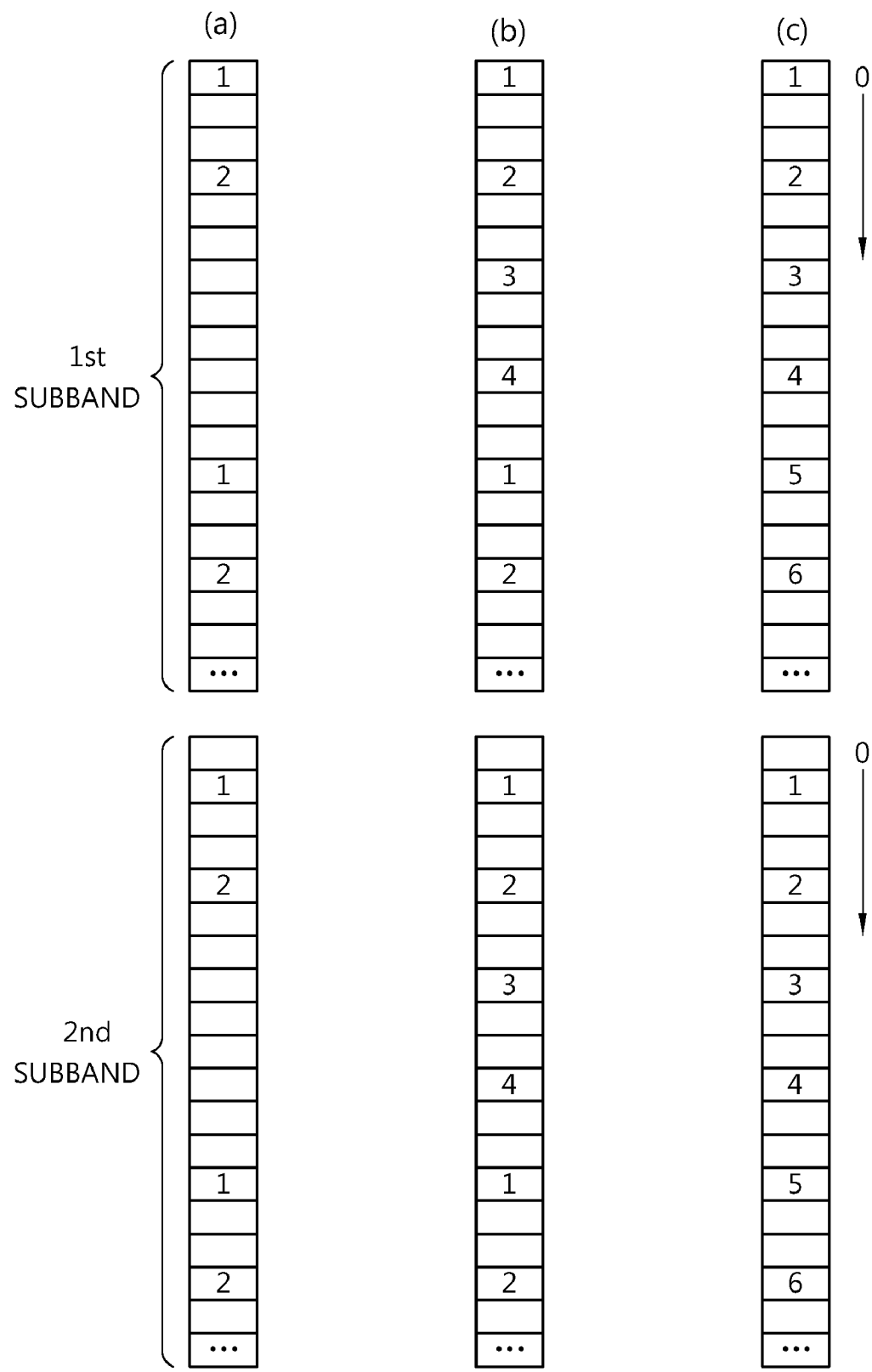

Equation 20 is another exemplary equation for determining a location of a midamble subcarrier according to the proposed midamble transmission method. Equation 20 shows a case where frequency shift is applied in each subband. In addition, Np is additionally applied as a power transmission parameter depending on the number of antennas in Equation 20. FIG. 37 shows an example of a midamble structure based on Equation 20. FIG. 37A shows a case of using 2 antennas. FIG. 37B shows a case of using 4 antennas. FIG. 37C shows a case of using 8 antennas.

$$b_k = \begin{cases} \sqrt{\dfrac{3 \cdot N_p \, 10^{0.2}}{N_t}} \cdot \\ \{1 - 2 \cdot G([k + u + \text{offset}_D(\textit{fft})] \mod \textit{fft})\}, \\ \text{when } k \ne \dfrac{N_{used} - 1}{2}, \\ k \mod(3 \cdot N_p) = 3 \cdot g + \left(BSID + \left\lfloor \dfrac{k-s}{N_1 * N_{sc}} \right\rfloor\right) \mod 3 \\ 0, \text{ when otherwise,} \end{cases} \quad \text{[Equation 20]}$$

where $N_p=4$ if $N_t=2$ or 4 $N_p=8$ if $N_t=8$

Figure 38:
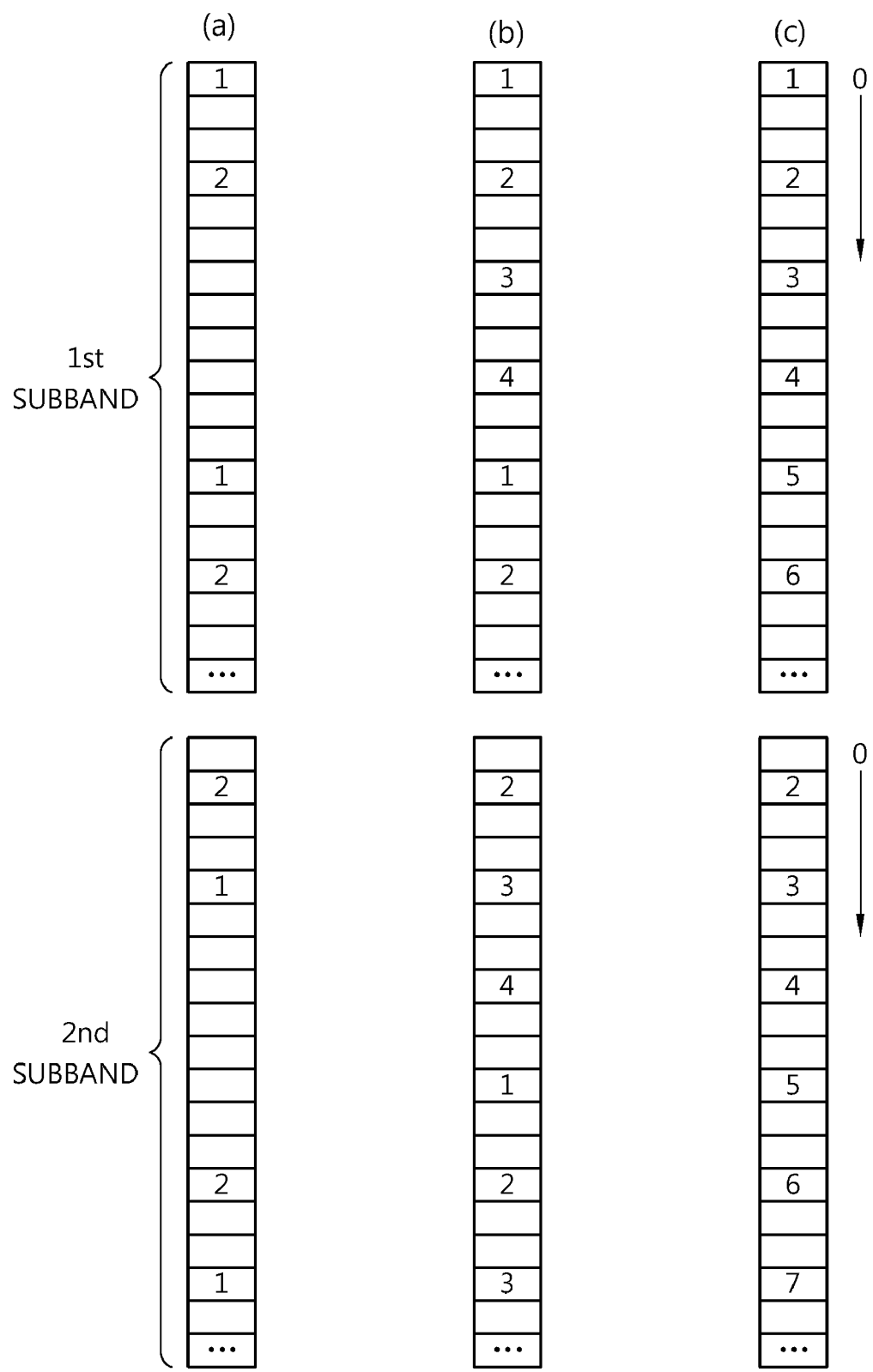

Equation 21 is another exemplary equation for determining a location of a midamble subcarrier according to the proposed midamble transmission method. Equation 21 shows a case where antenna shift and frequency shift is applied in each subband. In addition, Np is additionally applied as a power transmission parameter depending on the number of antennas in Equation 21. FIG. 38 shows an example of a midamble structure based on Equation 21. FIG. 38A shows a case of using 2 antennas. FIG. 38B shows a case of using 4 antennas. FIG. 38C shows a case of using 8 antennas.

$$b_k = \begin{cases} \sqrt{\dfrac{3 \cdot N_p \, 10^{0.2}}{N_t}} \cdot \{1 - 2 \cdot \\ G([k + u + \textit{offset}_D(\textit{fft})] \bmod \textit{fft})\}, \\ \text{when } k \ne \dfrac{N_{used} - 1}{2}, \\ k \bmod(3 \cdot N_p) = 3 \cdot \left(\left(g + \left\lfloor \dfrac{k-s}{N_1 \times N_{sc}} \right\rfloor\right) \bmod N_t\right) + \\ \left(BSID + \left\lfloor \dfrac{k-s}{N_1 \times N_{sc}} \right\rfloor\right) \bmod 3 \\ 0, \text{ when otherwise,} \end{cases} \quad \text{[Equation 21]}$$

where $N_p=4$ if $N_t=2$ or 4 and $N_p=8$ if $N_t=8$

Figure 39:
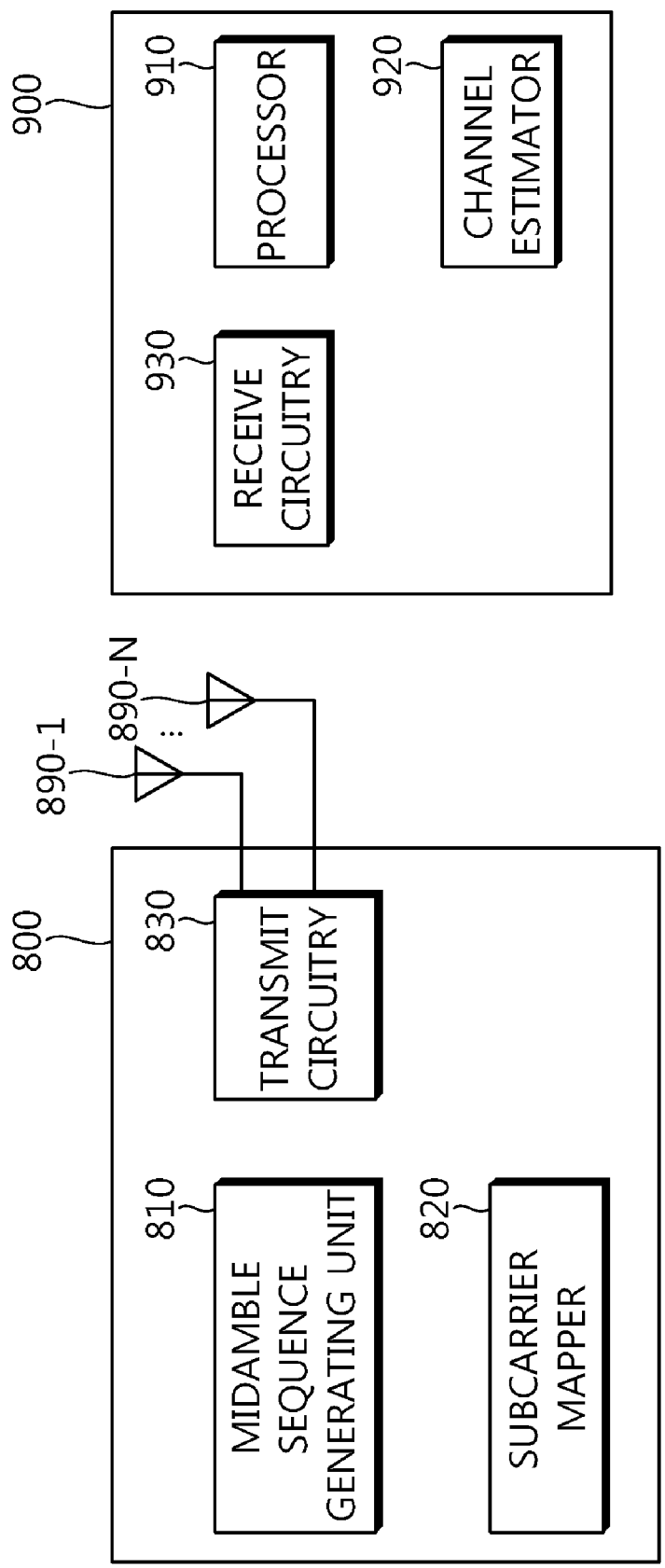
FIG. 39 is a block diagram of a BS and a UE for implementing an embodiment of the present invention.

FIG. 39 is a block diagram of a BS and a UE for implementing an embodiment of the present invention.

A transmitter 800 includes a midamble sequence generating unit 810, a subcarrier mapper 820, and a transmit circuitry 830. The midamble sequence generating unit 810 generates midamble sequences respectively for a plurality of antennas. The subcarrier mapper 820 maps the respective midamble sequences to subcarriers in a resource region in a unit of subband including 72 contiguous subcarriers. The transmit circuitry 830 transmits the respective midamble sequences to the UE through a plurality of antennas 890-1, . . . , 890-N. The respective midamble sequences are multiplexed in the resource region. A location of a subcarrier to which each midamble sequence is mapped in one subband is fixed irrespective of the number of the plurality of antennas. The respective midamble sequences may be mapped by being shifted along a frequency domain in each subband. The respective midamble sequences may be mapped by being shifted along the frequency domain by one subcarrier in contiguous subbands. An index of a subcarrier to which each midamble sequence is mapped may be determined by Equation 9 to Equation 21. Further, the respective midamble sequences may be mapped in a spacing of 12 subcarriers or 24 subcarriers. According to the structure of the transmitter 800, the midamble structure of FIG. 15 to FIG. 26 and FIG. 31 to FIG. 28 may be constructed.

A receiver 900 includes a processor 910, a channel estimator 920, and a receive circuitry 930. The receive circuitry 930 receives a radio signal and a plurality of midamble sequences transmitted from the BS. The channel estimator 920 estimates a channel state for each antenna on the basis of the plurality of midamble sequences. The processor 910 processes the radio signal on the basis of the measured channel state. The respective midamble sequences are multiplexed in the resource region. A location of a subcarrier to which each midamble sequence is mapped in one subband is fixed irrespective of the number of the plurality of antennas. The respective midamble sequences may be mapped by being shifted along a frequency domain in each subband. The respective midamble sequences may be mapped by being shifted along the frequency domain by one subcarrier in contiguous subbands. Further, the respective midamble sequences may be mapped in a spacing of 12 subcarriers or 24 sub carriers.

The present invention can be implemented using hardware, software, or a combination of them. In the hardware implementations, the present invention can be implemented using an Application Specific Integrated Circuit (ASIC), a Digital Signal Processor (DSP), a Programmable Logic Device (PLD), a Field Programmable Gate Array (FPGA), a processor, a controller, a microprocessor, other electronic unit, or a combination of them, which is designed to perform the above-described functions. In the software implementations, the present invention can be implemented using a module performing the above functions. The software can be stored in a memory unit and executed by a processor. The memory unit or the processor can use various means which are well known to those skilled in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of transmitting a midamble in a wireless communication system, the method comprising:
   generating a midamble sequence for each of a plurality of antennas; and
   transmitting the midamble sequence to a user equipment for each antenna,
   wherein a location of a subcarrier to which each midamble sequence is mapped is determined based on a frequency reuse factor (FRF),
   wherein the location of the subcarrier to which each midamble sequence is mapped is determined based on the following equation:

$$b_k = \begin{cases} \sqrt{3 \cdot 10^{0.2}} \cdot \{1 - 2 \cdot G([k + u + \textit{offset}_D(\textit{fft})] \bmod \textit{fft})\}, \\ \text{when } k \ne \dfrac{N_{used} - 1}{2}, \\ (k-s) \bmod(3 \cdot N_t) = 3 \cdot g + \left(\left\lfloor \dfrac{BSID}{256} \right\rfloor + \left\lfloor \dfrac{k-s}{N_1 \times N_{sc}} \right\rfloor\right) \bmod 3 \\ 0, \text{ when otherwise} \end{cases}$$

where $b_k$ is a complex coefficient for modulating subcarriers in an orthogonal frequency division multiplexing (OFDM) symbol to which the midamble sequence is mapped, k is a subcarrier index ($0 \le k \le N_{used}-1$), $N_{used}$ is the number of subcarriers to which a midamble sequence is mapped, Nt is the number of transmit antennas, G(x) is a Golay sequence ($0 \le x < 2047$) having a length of 2048 bits, fft is a fast Fourier transform (FFT) size, BSID is a cell identifier (ID), u is a shift value ($0 \le u \le 127$) which can be determined by u=mod(BSID, 128), $\textit{offset}_D(\textit{fft})$ is an offset value which differs depending on an FFT size, g is a transmit antenna index, and s is a parameter that varies depending on k wherein s=0 when k≦($N_{used}$−1)/2 and s=1 when k>($N_{used}$−1)/2.

2. The method of claim 1, wherein the respective midamble sequences are mapped to subcarriers in a unit of subband comprising 72 contiguous subcarriers.

3. The method of claim 1, wherein the respective midamble sequences are mapped by being shifted along a frequency domain in each subband.

4. The method of claim 3, wherein the respective midamble sequences are mapped by being shifted to a subcarrier allocated to another reuse region along the frequency domain in contiguous subbands.

5. The method of claim 1, wherein the respective midamble sequences are mapped with a spacing of one of 6 subcarriers, 12 subcarriers and 24 subcarriers.

6. The method of claim 1, wherein the respective midamble sequences are multiplexed based on at least one of multiplexing schemes comprising frequency division multiplexing (FDM), code division multiplexing (CDM), and time division multiplexing (TDM).

7. The method of claim 1, wherein the respective midamble sequences are transmitted in a second downlink subframe of a radio frame comprising a plurality of subframes in a time domain.

8. The method of claim 7, wherein the respective midamble sequences are mapped to a first OFDM symbol of the second downlink subframe.

9. An apparatus for transmitting a midamble in a wireless communication system, the apparatus comprising:
a transmit circuitry for transmitting a midamble sequence for each of a plurality of antennas to a user equipment through each antenna; and
a midamble sequence generator for generating the midamble sequence,
wherein a location of a subcarrier to which each midamble sequence is mapped is determined based on a frequency reuse factor (FRF),
wherein the location of the subcarrier to which each midamble sequence is mapped is determined based on the following equation:

$$b_k = \begin{cases} \sqrt{3 \cdot 10^{0.2}} \cdot \{1 - 2 \cdot G([k + u + \mathit{offset}_D(\mathit{fft})] \bmod \mathit{fft})\}, \\ \quad \text{when } k \neq \frac{N_{used} - 1}{2}, \\ (k-s) \bmod (3 \cdot N_t) = 3 \cdot g + \left( \left\lfloor \frac{BSID}{256} \right\rfloor + \left\lfloor \frac{k-s}{N_1 \times N_{sc}} \right\rfloor \right) \bmod 3 \\ 0, \text{ when otherwise} \end{cases}$$

where $b_k$ is a complex coefficient for modulating subcarriers in an OFDM symbol to which the midamble sequence is mapped, k is a subcarrier index (0≦k≦$N_{used}$−1), $N_{used}$ is the number of subcarriers to which a midamble sequence is mapped, Nt is the number of transmit antennas, G(x) is a Golay sequence (0≦x<2047) having a length of 2048 bits, fft is a fast Fourier transform (FFT) size, BSID is a cell identifier (ID), u is a shift value (0≦u≦127) which can be determined by u=mod(BSID, 128), $\mathit{offset}_D(\mathit{fft})$ is an offset value which differs depending on an FFT size, g is a transmit antenna index, and s is a parameter that varies depending on k wherein s=0 when k≦($N_{used}$−1)/2 and s=1 when k>($N_{used}$−1)/2.

10. An apparatus for receiving a midamble in a wireless communication system, the apparatus comprising:
a receive circuitry for receiving a radio signal and a plurality of midamble sequences transmitted from a base station;
a channel estimator for estimating a channel state for each of a plurality of antennas on the basis of the plurality of midamble sequences; and
a processor for processing the radio signal on the basis of the estimated channel state,
wherein a location of a subcarrier to which each midamble sequence is mapped is determined based on a frequency reuse factor (FRF),
wherein the location of the subcarrier to which each midamble sequence is mapped is determined based on the following equation:

$$b_k = \begin{cases} \sqrt{3 \cdot 10^{0.2}} \cdot \{1 - 2 \cdot G([k + u + \mathit{offset}_D(\mathit{fft})] \bmod \mathit{fft})\}, \\ \quad \text{when } k \neq \frac{N_{used} - 1}{2}, \\ (k-s) \bmod (3 \cdot N_t) = 3 \cdot g + \left( \left\lfloor \frac{BSID}{256} \right\rfloor + \left\lfloor \frac{k-s}{N_1 \times N_{sc}} \right\rfloor \right) \bmod 3 \\ 0, \text{ when otherwise} \end{cases}$$

where $b_k$ is a complex coefficient for modulating subcarriers in an OFDM symbol to which the midamble sequence is mapped, k is a subcarrier index (0≦k≦$N_{used}$−1), $N_{used}$ is the number of subcarriers to which a midamble sequence is mapped, Nt is the number of transmit antennas, G(x) is a Golay sequence (0≦x<2047) having a length of 2048 bits, fft is a fast Fourier transform (FFT) size, BSID is a cell identifier (ID), u is a shift value (0≦u≦127) which can be determined by u=mod(BSID, 128), $\mathit{offset}_D(\mathit{fft})$ is an offset value which differs depending on an FFT size, g is a transmit antenna index, and s is a parameter that varies depending on k wherein s=0 when k≦($N_{used}$−1)/2 and s=1 when k>($N_{used}$−1)/2.

* * * * *